(12) United States Patent
Bshara et al.

(10) Patent No.: US 10,521,365 B2
(45) Date of Patent: Dec. 31, 2019

(54) EMULATED ENDPOINT CONFIGURATION

(71) Applicant: Amazon Technologies, Inc., Seattle, WA (US)

(72) Inventors: Nafea Bshara, San Jose, CA (US); Adi Habusha, Moshav Alonei Abba (IL); Guy Nakibly, Kedumim (IL); Georgy Machulsky, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 341 days.

(21) Appl. No.: 14/872,964

(22) Filed: Oct. 1, 2015

(65) Prior Publication Data

US 2016/0098365 A1    Apr. 7, 2016

Related U.S. Application Data

(60) Provisional application No. 62/059,914, filed on Oct. 5, 2014.

(51) Int. Cl.
| | |
|---|---|
| *G06F 13/00* | (2006.01) |
| *G06F 13/10* | (2006.01) |
| *G06F 13/24* | (2006.01) |
| *G06F 13/42* | (2006.01) |
| *G06F 9/50* | (2006.01) |

(52) U.S. Cl.
CPC .......... *G06F 13/105* (2013.01); *G06F 9/5077* (2013.01); *G06F 13/24* (2013.01); *G06F 13/4282* (2013.01); *G06F 2213/0026* (2013.01); *G06F 2213/0058* (2013.01)

(58) Field of Classification Search
None
See application file for complete search history.

(56) References Cited

U.S. PATENT DOCUMENTS

| | | | |
|---|---|---|---|
| 6,553,439 B1 * | 4/2003 | Greger | G06F 13/4291 |
| | | | 710/11 |
| 7,613,847 B2 | 11/2009 | Kjos et al. | |
| 8,387,043 B2 | 2/2013 | Tanaka et al. | |
| 8,521,915 B2 | 8/2013 | Kishore et al. | |

(Continued)

FOREIGN PATENT DOCUMENTS

| | | |
|---|---|---|
| CN | 102171655 | 8/2011 |
| CN | 102576349 | 7/2012 |

(Continued)

OTHER PUBLICATIONS

PCT/US2015/053596, "International Search Report and Written Opinion", dated Jan. 21, 2016, 10 pages.

(Continued)

*Primary Examiner* — Henry Tsai
*Assistant Examiner* — Dean Phan
(74) *Attorney, Agent, or Firm* — Kilpatrick Townsend & Stockton LLP

(57) ABSTRACT

Techniques for emulating a configuration space by a peripheral device may include receiving a configuration access request, determining that the configuration access request is for a configuration space other than a native configuration space of the peripheral device, and retrieving an emulated configuration from an emulated configuration space. The configuration access request can then be serviced by using the emulated configuration.

25 Claims, 11 Drawing Sheets

(56) References Cited

U.S. PATENT DOCUMENTS

| | | | |
|---|---|---|---|
| 8,966,477 B2 | 2/2015 | Cen et al. | |
| 2004/0039892 A1* | 2/2004 | Goldschmidt | G06F 9/52 711/170 |
| 2007/0266179 A1* | 11/2007 | Chavan | G06F 13/4022 709/250 |
| 2008/0228971 A1* | 9/2008 | Rothman | G06F 9/45558 710/104 |
| 2009/0083471 A1* | 3/2009 | Frey | G06F 13/4054 710/316 |
| 2010/0169069 A1 | 7/2010 | Diamant et al. | |
| 2012/0297379 A1 | 11/2012 | Anderson et al. | |
| 2014/0040672 A1* | 2/2014 | Saghi | G06F 9/30101 714/45 |

FOREIGN PATENT DOCUMENTS

| | | |
|---|---|---|
| JP | H09288583 A | 11/1997 |
| JP | H11288400 | 10/1999 |
| JP | 2005010919 A | 1/2005 |
| JP | 2009187368 A | 8/2009 |
| KR | 10-2014-0002048 A | 1/2014 |
| TW | I421766 | 1/2014 |
| WO | 2013089907 | 6/2013 |

OTHER PUBLICATIONS

TW104132725 , "Office Action", dated Mar. 23, 2017, 7 pages.
TW104132725 , "Office Action", dated Nov. 24, 2016, 10 pages.
SG11201702584U , "Written Opinion", dated Aug. 22, 2017, 6 pages.
JP2017-536236, "Office Action", dated Mar. 12, 2018, 7 pages.
SG11201702584U, "Examination Report", dated Mar. 19, 2018, 4 pages.
SG11201702584U, "Notice of Decision to Grant", dated Mar. 27, 2018, 2 pages.
KR10-2017-7008809, Notice of Preliminary Rejection, dated Dec. 19, 2017, 9 pages.
EP15787738.2 , "Office Action", dated Sep. 18, 2018, 4 pages.
CN201580053816.3 , "Office Action", dated Jan. 4, 2019, 7 pages.
JP2017-536236 , "Office Action", dated Nov. 5, 2018, 2 pages.
TW104132725 , "Notice of Decision to Grant", dated Dec. 27, 2018, 3 pages.
TW106117105 , "Notice of Decision to Grant", dated Dec. 28, 2018, 3 pages.
IL251417 , "Office Action", dated May 7, 2019, 6 pages.
JP2017-536236 , "Notice of Allowance", dated Jun. 3, 2019, 3 pages.

* cited by examiner

EMULATED ENDPOINT CONFIGURATION

CROSS-REFERENCE TO RELATED APPLICATION

This application is a non-provisional application of and claims priority to U.S. Provisional Application No. 62/059,914, filed Oct. 5, 2014, which is incorporated by reference herein in its entirety.

BACKGROUND

Computing systems may include multiple peripheral devices. Peripheral devices may extend, adapt, and/or modify the functionality of the computing system. A peripheral device may implement one or more functions. For example, a peripheral device can be a network interface card that provides network connectivity functions, or a mass storage device that provides data storage functions, etc.

Some peripheral devices may include configuration registers that are used to control the behavior of the peripheral device. For example, if the peripheral device is a Peripheral Component Interconnect (PCI) compliant device, the peripheral device may have a set of PCI configuration space registers. The configuration registers may include fields that can be read to indicate the capabilities of the peripheral device, and may include fields that can be written to enable, disable, or alter functions of the peripheral device. Generally, configuration registers are implemented as physical hardware registers, and the fields are defined and hardcoded according to the particular capabilities and functions of the peripheral device. Thus, once manufactured, the definition of the configuration registers of the peripheral device is typically fixed and cannot be changed.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Computing systems may include multiple peripheral devices. Peripheral devices may extend, adapt, and/or modify the functionality of the computing system. For example, peripheral devices may provide storage, network connectivity, and/or audio and video support to a computing system, etc. Peripheral devices typically communicate with a computing system through one or more busses. Data transfer on a bus can be defined by a bus protocol. Examples of bus protocols may include the Peripheral Component Interconnect (PCI) family of bus protocols (e.g., PCI, PCI-eXtended (PCI-X), PCI Express (PCIe), PCI derivatives such as Accelerated Graphics Port (AGP), etc.), among others.

Techniques described herein include components and methods to emulate some or all of the configuration space of a peripheral device. The emulated configuration space can be used by a peripheral device to represent itself as different types of peripheral devices with different capabilities. For example, the emulated configuration space may allow a peripheral device to represent itself as a network interface card in some instances, or as a video card in other instances, etc. The emulated configuration space can also be dynamically modified, augmented, duplicated, or replaced with an entirely different configuration space. Additionally, multiple emulated configuration spaces can be maintained for different functions. Emulated configuration spaces may also require less hardware. For example, a device implementing single-root I/O virtualization (SR-IOV) may include emulated configurations that can be scaled for any number of physical and/or virtual functions without requiring physical hardware registers for each function. Furthermore, the number of functions emulated by the emulated configuration space can be dynamically modified.

The techniques described herein may also provide an emulation module to facilitate access to the emulated configuration spaces. The emulation module may be implemented as software, hardware or a combination of software and hardware (e.g., software executed by a processor of the peripheral device). The emulation module may interact with emulated configuration spaces, including reading and writing representations of configuration registers.

I. Systems

Figure 1:
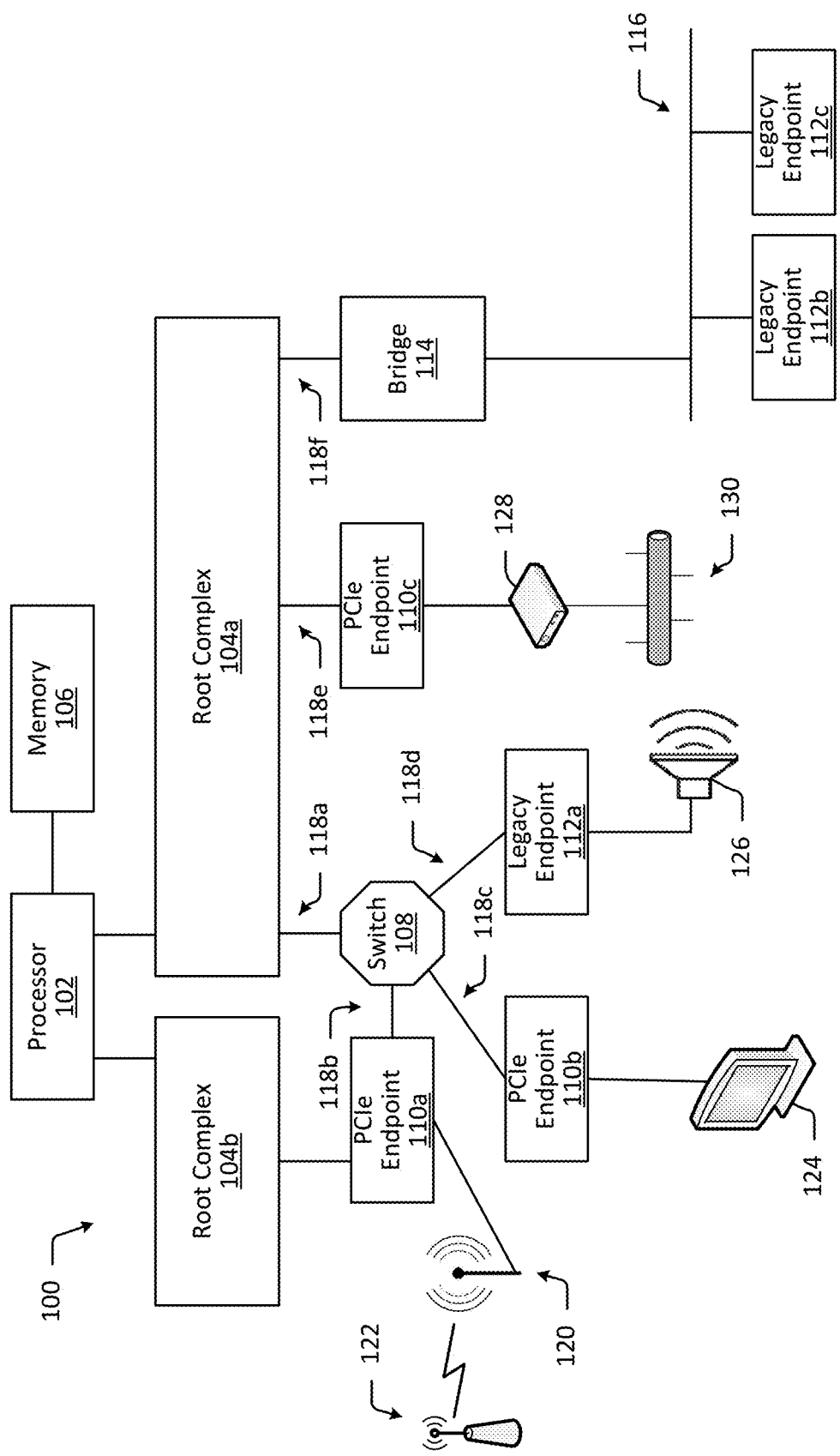
FIG. 1 illustrates an example of a computing system that includes multiple peripheral devices, according to some embodiments.

FIG. 1 illustrates an example of a computing system 100 that includes multiple peripheral devices. Peripheral devices may include hardware devices and/or devices that include a combination of hardware and software that can be attached to a computing system to add functionality to the system. Examples of peripheral devices include storage devices, video cards, audio cards, wired and/or wireless network adapters, adapters to provide additional ports to the system, such as serial and/or parallel ports, and bridges, hubs, and/or switches that provide ports for additional peripheral devices, among others. Generally, peripheral devices can be connected and disconnected from the computing system to change the functionality of the system. In some cases, the computing system must be powered down for a peripheral device to be added or removed. In other cases, the peripheral device can be attached or removed while the computer system is powered (e.g., often referred to as "hot-swapping" or "hot-plugging").

The example in FIG. 1 illustrates a system that includes peripherals that implement one or more variations of the Peripheral Component Interconnect (PCI) bus standard. A bus is a communication channel that transfers data within a computing system, or between a computing system and other devices. A standardized bus protocol is a data transfer protocol for which a specification has been defined and adopted by various manufacturers. Compliant devices are compatible with computing systems implementing the bus protocol, and vice versa. PCI describes a family of related, standardized bus protocols. As used herein, PCI includes the original PCI standard, PCI-eXtended (PCI-X), Accelerated Graphics Port (AGP), and PCI Express (PCIe, also referred to as PCI-XP). As used herein, the term "PCI" may be used to describe any protocol in the PCI family of bus protocols. In the example shown in FIG. 1, PCI is provided only as example of a bus protocol that can be implemented by a computing system. Other bus protocols may include, for example, Industry Standard Architecture (ISA), Extended ISA (EISA), Video Electronics Standards Association (VESA), Micro Channel, any of the Advanced Technology Attachment (ATA) family of busses, etc. The illustrated example can also be implemented with a combination of standardized bus protocols, proprietary bus protocols, and/or with a combination of standardized and proprietary bus protocols.

The example computing system 100 may include a processor 102, one or more root complexes 104a-b, a memory subsystem 106, a switch 108, a bridge 114, and a number of peripheral devices. The peripheral devices may be referred to as "endpoints." The processor 102 may be a general purpose computing unit such as one manufactured by Intel®, AMD®, ARM®, Qualcomm®, etc., and generally is capable of executing software code. The processor 102 may include multiple processing cores.

The root complex 104a may be a hardware device or a hardware and software device that connects the processor 100 and memory subsystem 106 to the endpoints 110a-c, 112a-c. Endpoints 110a-c, 112a-c may be connected directly to the root complex 104a. Alternatively or additionally, endpoints 110a-c, 112a-c may be connected to the root complex 104a through a switch 108 or a hub, etc. Bridges 114 may also be connected to the root complex 104a. The root complex 104a may forward transactions and responses to and from processor 102, and/or may generate and respond to transactions on behalf of the processor 102. In some cases, the root complex 104a may also route transactions from one endpoint 110a-c, 112a-c to another, and/or between endpoints 110a-c, 112a-c, switches 108, and bridges 114. The root complex 104a may provide services for the computer system 100, such as a hot plug controller, power management controller, interrupt controller, and/or error detection and reporting. In some cases, the root complex 104a and/or 104b may be implemented as part of a host system (e.g., processor 102). In some embodiments, computing system 100 may include more than one root complex. Each root complex may connect to a different set of peripheral devices. In some cases, one or more of the peripheral devices may connect to more than one root complex. For example, as illustrated in FIG. 1, endpoint 110a can be connected to both root complex 104a and 104b.

The memory subsystem 106 provides temporary or long-term storage for data that may be used by the computing system 100. The memory subsystem 106 may include Dynamic Random Access Memory (DRAM) (e.g., Synchronous DRAM (SDRAM), Double Data Rate (DDR) SDRAM, etc.) and/or other types of memory such as Static Random Access Memory (SRAM), flash memory, etc.

The endpoints 110a-c, 112a-c are peripheral devices that can generate and/or respond to data transactions. For example, the endpoints 110a-c, 112a-c may be "requesters" (transaction generators) and/or "completers" (transaction responders). In PCI implementations, endpoints 110a-c may include peripheral devices that implement PCIe, and endpoints 112a-c may include peripheral devices that implement legacy PCI. Endpoints 110a-c, 112a-c may be connected to the computing system 100 through a shared bus. For example, the legacy endpoints 112b-c are connected to a shared PCI bus 116. Alternatively or additionally, the endpoints 110a-c, 112a-c may be connected in a switching fabric topology. A switching fabric topology may include point-to-point connections between the devices connected to the fabric, and may include a routing system for passing messages between the devices. In a switching fabric, transactions may be spread across multiple physical links. The connections 118a-f between devices in the fabric may also be referred to as busses.

The switch 108 functions as a bridge between various peripheral devices, including the root complex 104a and the endpoints 110a-c, 112a. The switch 108 may route transactions between endpoints 110a-c, 112a, and between the endpoints 110a-c, 112a and the root complex 104. The switch 108 may also provide arbitration to prioritize incoming and outgoing data transactions. The root complex 104 and the endpoints 110a-c, 112a may treat the switch 108 as another peripheral device requester and/or completer.

The bridge 114 may provide connectivity to other busses or switching fabrics. The other busses or switching fabrics may implement a PCI variant or another protocol. For example, in the example of FIG. 1, the bridge 114 provides connectivity to a bus implementing the legacy PCI standard. The bridge 114 may include mechanisms to translate from one bus standard, such as legacy PCI, to another protocol, such as PCIe.

In the example of FIG. 1, components such as the processor 102, the root complexes 104a-b, the memory subsystem 106, switch 108, the bridge 114, and the endpoints 110a-c, 112a-c are illustrated as separate components. In some implementations, one or more of these components may be combined into a single component. In other implementations, one or more of these components may be implemented on a single chip. In other implementations, one or more of these components may be partially or fully implemented in hardware, in software, and/or in a combination of hardware and software.

As noted above, the endpoints or peripheral devices may add to and/or modify the functionality of the computing system 100. For example, one endpoint 110a may implement a Wi-Fi adapter 120. Using the Wi-Fi adapter 120, the computing system 100 may be able to communicate wirelessly with a wireless access point 122, and thereby access a network. As another example, another endpoint 110b may implement a video card. A video card may include a port to connect a monitor 124 or other display device. As a further example, the computing system 100 may include a legacy endpoint 112a that implements a sound card. A sound card may include a port or jack that accepts a plug for a speaker 126 or other audio output device. As one more example, an endpoint 110c may implement an Ethernet adapter, and provide a connection to a gateway device 128, such as a DSL or cable modem. Using the gateway device 128, the computing system 100 may access a network 130.

As illustrated by these examples, different types of peripheral devices can be connected to the system, including network adapters, video cards, audio cards, and others. In some cases, a peripheral device may implement more than one functional device. For example, in some cases, a single endpoint may include both a video card for outputting to a monitor 124 and a sound card for outputting to a speaker 126. In some implementations, functions can also be added to a peripheral device, for example, by connecting daughter cards or external devices to expansion slots or external ports on the peripheral device. In some embodiments, peripheral devices that implement PCI may include up to eight separate functions. In these implementations, the PCI device may indicate the implemented function or functions using a class code and optional subclass code. The class code and optional subclass code may be located in a configuration register. Configuration registers are described in further detail below.

Table 1 lists the PCI device class codes and their descriptions. The class code is given as an 8-bit hexadecimal value.

TABLE 1

PCI Device Class Codes

| Class Code | Description |
| --- | --- |
| 00h | Unclassified device and/or devices built before class codes were defined. |
| 01h | Mass storage controller. |
| 02h | Network controller. |
| 03h | Display controller. |
| 04h | Multimedia device. |
| 05h | Memory controller. |
| 06h | Bridge device. |
| 07h | Simple communications controllers. |
| 08h | Base system peripherals. |
| 09h | Input devices. |
| 0Ah | Docking stations. |
| 0Bh | Processors. |
| 0Ch | Serial bus controllers. |
| 0Dh | Wireless controllers. |
| 0Eh | Intelligent I/O controllers. |
| 0Fh | Satellite communications controllers. |
| 10h | Encryption/decryption controllers. |
| 11h | Data acquisition and signal processing controllers |
| FFh | Device does not fit any of the defined class codes. |

When a computing system such as computing system 100 illustrated in FIG. 1 initially powers up, the processor 102 may be unaware of any endpoints that are connected to the system. The processor 102 may be aware of the root complexes 104a-b, and possibly also that the root complex is connected to one or more busses. The processor 102 may discover the endpoints 110a-c, 112a-c and the functions that they provide by executing a process to scan and configure the system. This process may be referred to as an enumeration process. During an enumeration process, software executing on the processor 102 may scan each bus 118a, 118e, 118f connected to the root complex 104, and identify each endpoint 110a-c, 112a-c, switch 108, and/or bridge 114 attached to each bus 118a, 118e, 118f. The processor 102 may further direct the root complex 104 to initiate transactions to read and write configuration registers in each endpoint 110a-c, 112a-c, switch 108, and/or bridge 114. Configuration read transactions may inform the processor 102 of the capabilities and type of device of each endpoint 110a-c, 112a-c, switch 108, and/or bridge 114. Configuration write transactions can be used to configure and control each endpoint 110a-c, 112a-c, switch 108, and/or bridge 114. For example, during enumeration each endpoint 110a-c, 112a-c, switch 108, and/or bridge 114 may be assigned a bus and device number. Configuration registers are typically implemented as physical hardware registers of the peripheral device, and the definition of the configuration registers in a peripheral device is generally fixed and cannot be dynamically changed.

As noted above, an endpoint may implement multiple functions. An enumeration process may also discover the functions implemented by each endpoint. In some cases, each function may include its own set of configuration registers. Reading function-specific configuration registers may inform the processor 102 of the nature of the function (e.g. the function implements a video driver). The function-specific configuration registers may also store configurations and settings that are specific to the function. Writing function-specific registers may configure the function as required by the computing system or by processor 102.

Upon discovering the switch 108, the processor 102 may also scan and configure endpoints 110a-c connected to the switch 108. Upon discovering the bridge 114, the processor 102 may also scan and configure endpoints 112b-c attached to the bus 116 on the other side of the bridge 114.

In some cases, a peripheral device implementing an emulated configuration space may represent itself to the computing system as different peripheral devices. For example, a peripheral device implementing an emulated configuration space may represent itself as a network interface card with configuration registers specific to a network interface card in some instances, or represent itself as a different peripheral device such as a video card or a sound card with configuration registers specific to such a peripheral device in other instances. The emulated configuration space can also be modified, duplicated, or replaced with an entirely different configuration space. Additionally, multiple emulated configuration spaces may be maintained for a particular function. For example, a computing system may be running multiple virtual machines, where each virtual machine is running a different operating system. Each virtual machine may require a different configuration for the same function provided by a peripheral device. In such cases, emulated configuration spaces in a peripheral device may provide an emulated configuration for each virtual machine. Emulated configuration spaces may also require less hardware. For example, a device that includes SR-IOV may include emulated configurations for any number of physical and/or virtual function, instead of requiring physical hardware registers for each function.

II. Emulated Configuration Space

Figure 2:
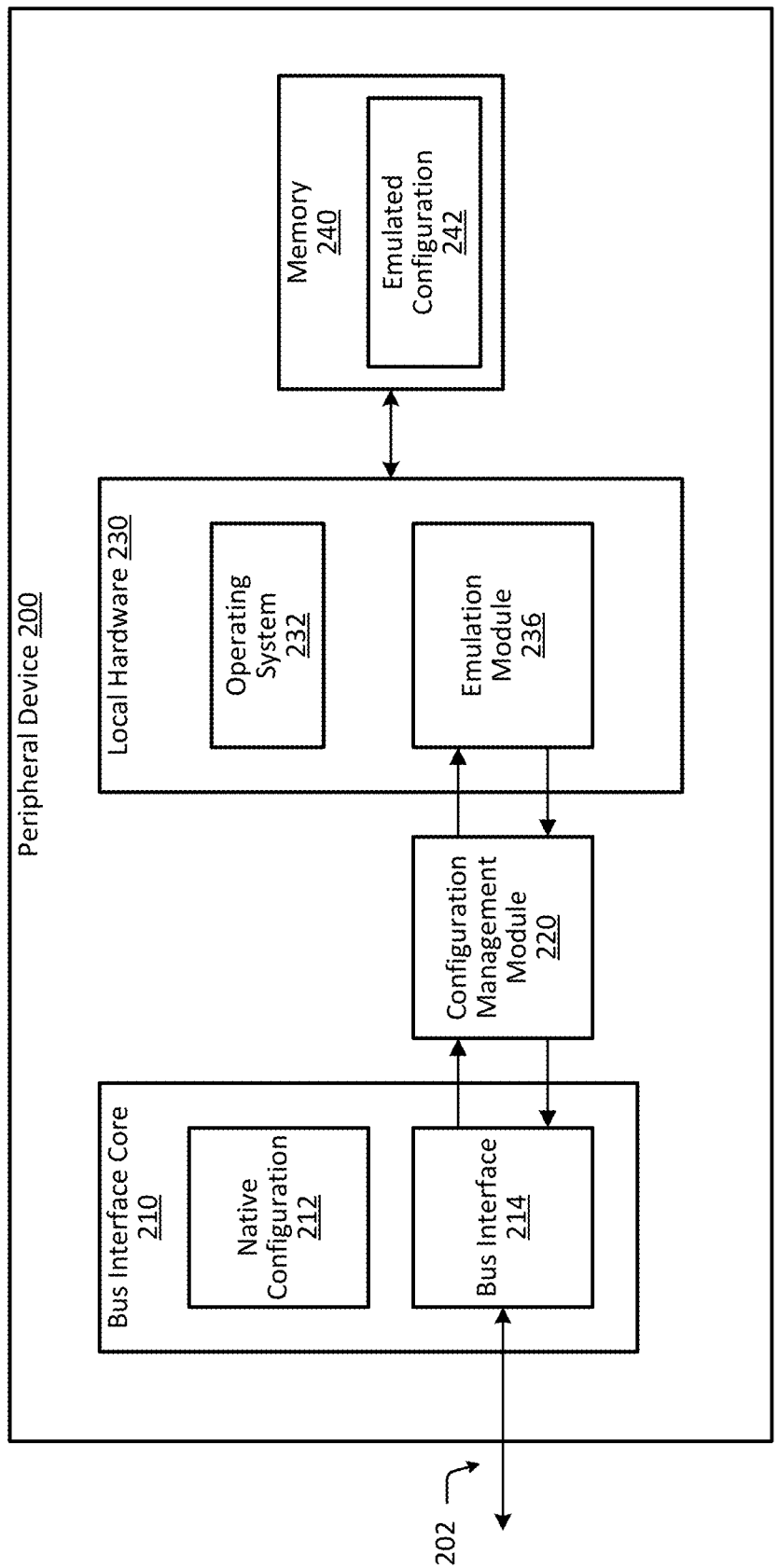
FIG. 2 illustrates a block diagram of a peripheral device with an emulated configuration space, according to some embodiments.

FIG. 2 illustrates an example of a peripheral device 200 implementing an emulate configuration space, according to some embodiments. For example, peripheral device 200 can be used to replace one or more of the endpoints and/or root complexes illustrated in FIG. 1. Although peripheral device 200 is shown as a standalone device, it should be noted that the components of peripheral device 200 can be integrated with a host system (e.g. host processor) such that peripheral device 200 and the host system can be implemented on the same silicon die or package. For example, peripheral device 200 can be an integrated graphics device implemented on the same chip as a host processor. The illustrated example peripheral device may implement any bus protocol, such as the PCI family of protocols, ISA, EISA, VESA, Multi-Channel, etc. A bus protocol may provide definitions for configuration registers, with specified addresses, that a peripheral device is expected to include. The peripheral device 200 of FIG. 2 may emulate at least part of the configuration address space that is defined for the implemented bus protocol. In some cases, the peripheral device 200 may also include configuration registers that are not emulated such as configuration registers for implementing the basic functionality of the peripheral device (e.g., for setting bus speed, etc.), and/or basic functionality common to all peripheral devices that implement a specific bus protocol. These non-emulated configuration registers may be referred to as "native" configuration space.

In some implementations, emulation refers to the ability of a program or device to imitate another program or device. For example, the peripheral device 200 of FIG. 2 may include emulated configuration space to emulate the function or functions of different peripheral devices. For example, peripheral device 200 may emulate a video card in one context, and a mass storage device in another context. As another example, peripheral device 200, implementing one function and manufactured by one company, may be able to emulate a peripheral device manufactured by a different company and implementing the same function. In some embodiments, peripheral device 200 can be used to emulate more than one peripheral device, and thus in some scenarios, peripheral device 200 can emulate an entire peripheral subsystem.

Peripheral device 200 may include a bus interface core 210, a configuration management module 220, local hardware 230, and a memory 240. The peripheral device 200 may be in communication with a computing system over a bus 202. The bus 202 may implement a specific bus protocol.

The bus interface core 210 may include circuitry and logic required by peripheral device 200 to communicate with bus 202. For example, bus interface core 210 may include a bus interface 214 for communicating with the bus 202. The bus interface 214 may include a physical connection to the bus 202, including circuitry to manage any electrical properties of the link to the bus 202. The bus interface 214 may further include logic for synchronizing to the bus 202, decoding incoming transactions and encoding outgoing transactions, and/or detecting and possibly managing errors in incoming or outgoing data, among other operations.

The bus interface core 210 may also include a native configuration space 212. In peripheral devices that do not include an emulated configuration space, typically the bus interface core 210 includes all the configuration registers of the peripheral device, for example, as defined by the bus protocol. Furthermore, in such implementations the bus interface core 210 typically services all read and write transactions to the configuration registers (which may also be referred to as configuration access requests or configuration accesses), and provides a response (if necessary) to the bus 202. In contrast, in the example peripheral device 200, the native configuration space 212 may include native configuration registers that are a subset of the configuration registers of the peripheral device 200. For example, the native configuration registers may be associated with basic functionalities that may be common to all peripheral devices for a given bus protocol (e.g., for setting bus speed, etc.), and/or may otherwise be configuration registers that are unnecessary or inconvenient to emulate. In some embodiments, the native configuration space 212 can also be emulated.

In some implementations, the bus interface core 210 may detect read and write transactions addressed to the native configuration space 212. In such implementations, the bus interface core 210 may service configuration transactions directed to the native configuration register 212. Furthermore, in these implementations, configuration transactions that are addressed to configuration space not within the native configuration space 212 may be directed to the configuration management module 220. In other implementations, the bus interface core 210 directs all configuration read and write transactions, regardless of where they are addressed to, to the configuration management module 220, and the configuration management module 220 may determine whether the transaction is for the native configuration space 212 or not.

The configuration management module 220 may provide management of read and write transactions directed to configuration registers. In some implementations, the configuration management module 220 may provide transaction logging. Transaction logging may be implemented by hardware and/or software that logs or tracks incoming configuration transactions. Upon receiving a configuration transaction, the bus interface core 210 may log the transaction with the configuration management module 220. The bus interface core 210 may continue with other operations, without needing to wait for the logged configuration transaction to complete. Configuration transactions can be read from the transaction log and be serviced by the local hardware 230, for example, whenever the local hardware 230 is free to do so. The local hardware 230 may remove a transaction from the log when the transaction is read, or may remove the transaction after the transaction has been executed and responded to, or otherwise indicate in the log that the transaction has been serviced or is in the process of being serviced.

The local hardware 230 can be implemented as one or more local processors, one or more local processor cores, a local processor cluster, programmable gate arrays, or control logic circuitry adapted to process configuration transactions. In implementations that include multiple processors or processor cores, each processor or processor core may independently or cooperatively execute software code. In such implementations, each processor or processor core may service multiple transactions from the configuration management module 210 in parallel. In implementations that include one processor, the processor may be multi-threaded, and also be able to service multiple transactions in parallel. The local hardware 230 may run an operating system 232. The operating system 232 may be a commercial operating system, such as Linux, Windows®, iOS®, etc., or may be a proprietary operating system.

The local hardware 230 may implement or execute an emulation module 236. In some embodiments, because the configuration transactions may require fast response times, the emulation module can be executed in a secure environment or be executed with sufficient privileged such that processing of the configuration transactions are not interrupted. The emulation module 236 may receive transactions, including configuration transactions, from the configuration management module 220, and may service those transactions. Servicing a transaction may include identifying the transaction's type (e.g., read and/or write), identifying the source of the transaction, identifying the destination that the transaction is directed to, executing the transaction, and/or generating a response to the transaction, if necessary. For example, a configuration read transaction may include reading a configuration register and responding with the information read from the register. As another example, a configuration write register may include updating the contents of the configuration register. In some cases, a configuration write may be responded to with an acknowledgment that the write transaction has completed.

In some implementations, the emulation module 236 may determine whether a configuration transaction is directed to the native configuration space 212 or emulated configuration space 242. When a configuration transaction is directed to the native configuration space 212, the emulation module 236 may communicate with the bus interface core 210 to read or write the native configuration register. When a configuration read is directed to emulated configuration space 242, the emulation module 236 may read a value representing the contents of the configuration register from the emulated configuration space 242. When a configuration write is directed to emulated configuration space 242, the emulation module 236 may write or update data in the emulated configuration space 242 that represents the contents of the configuration register. In some implementations, a configuration transaction may be directed to configuration registers associated with one or more functions, in which case the emulation module 236 may identify the function and access the emulated configuration register that is specific to that function. In other implementations, a configuration transaction may have come from one of multiple sources, such as one of several virtual machines that may be running different operating systems. In such implementations, the emulation module 236 may identify the source, and access the emulated configuration register that may be designated or suitable for that source.

The memory 240 provides storage for data that may be operated on by the local hardware 230. The memory module 240 may include DRAM, (e.g., SDRAM, DDR-SDRAM), SRAM, flash, or some other memory type, or any combination thereof. In some embodiments, memory 240 can be implemented as an external memory module, or as an internal memory of the peripheral device 200, or a combination thereof. The memory module 240 may store an emulated configuration space 242. The emulated configuration space 242 may include representations for all or some of the configuration register address space defined for any number of peripheral devices. In some implementations, the emulated configuration space 242 includes configuration space that may affect the operation of a function of the peripheral device. In some implementations, the emulated configuration space 242 excludes native configuration space that may be basic and/or common to all peripheral devices implementing the bus protocol, or that may be unnecessary or inconvenient to emulate. The emulated configuration registers may include fields that are read only, clear-on-read (or have clear-on-read bits), may be both readable and writeable, may be write-zero-to-clear (or have write-zero-to-clear bits), and/or be write-one-to-set (or have write-on-to-set bits).

The emulated configuration space 242 may be stored in memory 240 as a text file, source code, object code, as a script, and/or in some other format that is readable by the emulation module 236. In some embodiments, the emulated configuration 242 may be encrypted. In some implementations, the emulated configuration 242 can be modified or replaced. For example, additional emulated configuration registers, or updated versions of the emulated configuration registers, may be provided, for example through a website on the Internet. In these implementations, the additional or updated emulated configuration registers can be downloaded from the Internet and uploaded to the memory 240. In some implementations, the memory 240 may store multiple emulated configuration spaces 242, or multiple versions of the same emulated configuration space 242.

Figure 3:
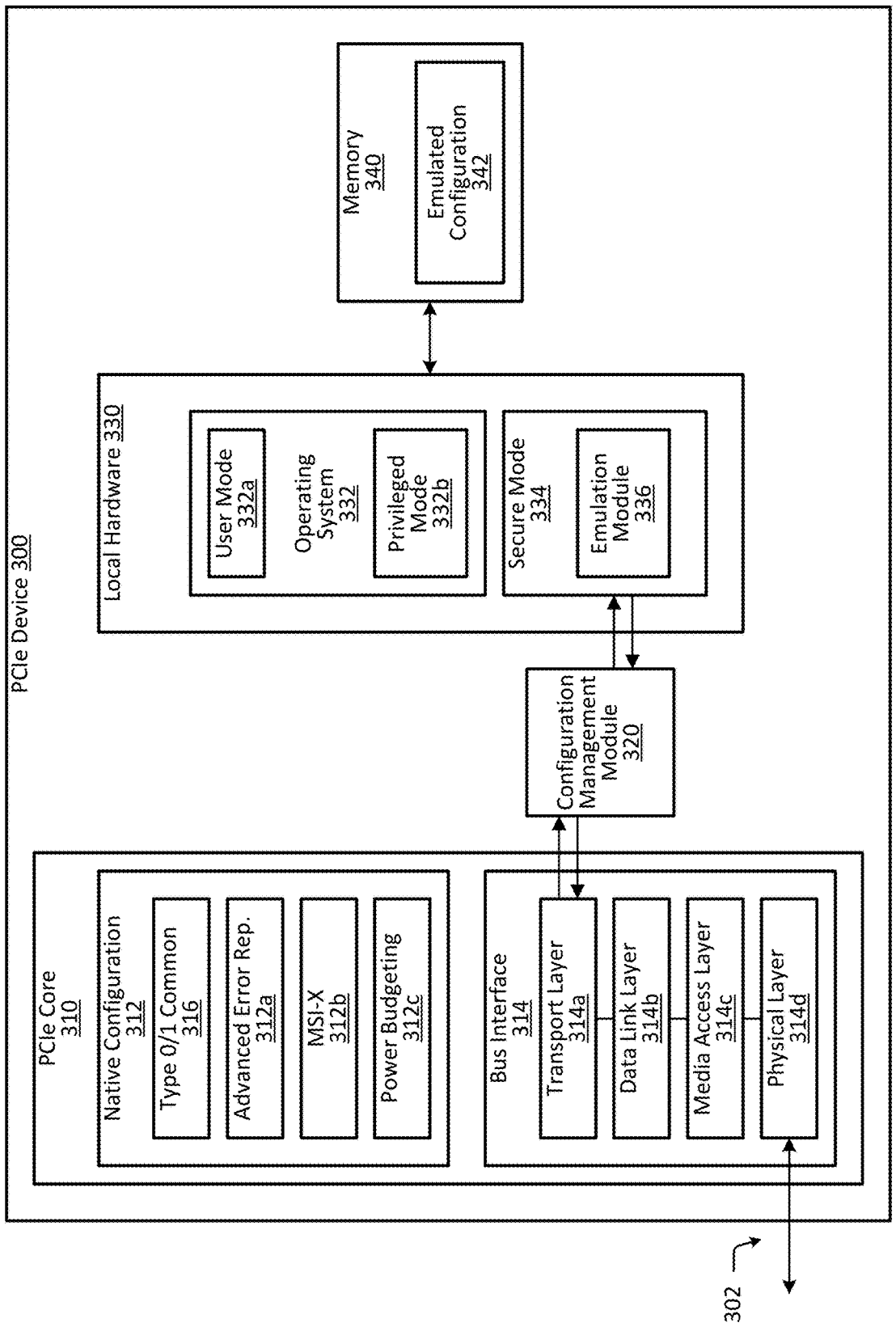
FIG. 3 illustrates a block diagram of a peripheral device with an emulated configuration space, according to some embodiments.

FIG. 3 illustrates an example of a PCIe implementation of a peripheral device 300, according to some embodiments. The PCIe peripheral device 300 of FIG. 3 may include a PCIe core 310, a configuration management module 320, local hardware 330, and a memory 340. The PCIe peripheral device 300 may communicate with a computing system through a bus 302. The bus 302 may implement the PCIe protocol.

The PCIe core 310 may include at least some of the functionality required to support communication on a bus using PCIe. The PCIe core 310 may include a bus interface 314. The bus interface 314 may implement network protocol layers 314a-d that manage incoming and outgoing transactions. For outbound transactions, the transaction layer 314a may form a packet with information provided by a transaction initiator, such as the PCIe core 310 itself, the configuration management module 320, or the local hardware 330. The data link layer 314b may add additional information to the packet, for example, packet header information and/or error checking information that can be used by the recipient of the transaction to validate the integrity of the information. The media access layer 314c may provide addressing information such as physical address of the source and destination of the transaction. The physical layer 314d may encode the packet into electrical signals and transmit the packet onto the bus 302. For incoming transactions, the physical layer 314d accepts a packet from the bus 302 and decodes the packet. The media access layer 314c may process the source and destination address of the transaction. The data link layer may 314b may parse the packet header information and check for errors. The transaction layer 314a may convert the information contained in the packet into a format that can be processed by the PCIe core 310 and/or the local processor 330.

The PCIe core 310 may also include native configuration space 312. The native configuration space 312 may include configuration registers that are associated with basic functionality, and/or that may be common to all PCIe-based peripheral devices, and/or that may be unnecessary or inconvenient to emulate. Examples of such registers include a Type 0/1 common register header 316, Advanced Error Reporting capability registers 312a, Message Signaled Interrupts extended (MSI-X) capability registers 312b, and power budgeting capability registers 312c. Any remaining configuration register space may be found, for example, in the emulated configuration space 324. In some embodiments, native configuration space 312 may also be emulated. Hence, for example, in some embodiments, a PCIe-based peripheral device may have all of its PCI configuration space registers emulated.

In some implementations, the PCIe core 310 may detect read and write transactions addressed to the native configuration space 312. In such implementations, the PCIe core 310 may service configuration transactions directed to the native configuration space 312. Furthermore, in these implementations, configuration transactions that are addressed to a configuration space that is not within the native configuration space 312 may be directed to the configuration management module 320. In other implementations, the PCIe core 310 directs all configuration read and write transactions to the configuration management module 320, regardless of whether they are addressed to the native configuration space 312 or not.

The configuration management module 320 may provide management of read and write transactions directed to configuration registers. In some implementations, the configuration management module 310 may provide transaction logging. Upon receiving a configuration transaction, the PCIe core 310 may log the transaction with the configuration management module 320. The PCIe core 310 may then continue with other operations. Configuration transactions may be read from the log and be serviced by the local hardware 330. The local processor 330 may remove a transaction from the log when the transaction is read, or may remove the transaction after the transaction has been executed and responded to, or otherwise indicate in the log that the transaction has been serviced or is in the process of being serviced.

The local hardware 330 may include one or more processors, one or more processor cores, a processor cluster, programmable gate arrays, or control logic circuitry adapted to process configuration transactions. The local hardware 330 may run an operating system 332. The operating system 332 may provide a user mode 332a and a privileged mode 332b. The user mode 332a may execute, for example, user applications that have been loaded into the PCIe peripheral device 300. The privileged mode 332b may execute system functions.

The local hardware 330 may also include a secure mode 334 of operation (e.g., ARM secure mode, etc.). A program or software running in secure mode 334 may be isolated from other programs within the local hardware 330. For example, the operating system module 332 and/or applications running on top of the operating system module 332 may not be able to access modules running within the secure module 334. Conversely, in some embodiments, programs running within the secure mode 334 may not be able to influence modules running outside of the secure module 234. Thus, the secure mode 334 may provide an environment in which a program can execute without intervention or interference from other programs that may be executing within the local hardware 330. Programs executing in the secure mode 334 may be highly optimized, and/or may have higher priority than other programs. In some embodiments, the secure mode 334 may be implemented as a section of hardware and/or software that is logically and/or physically isolated within the local hardware 330.

In some embodiments, an emulation module 336 can be implemented as emulation control logic circuitry in the local hardware 330, and/or as emulation software being executed in secure mode 334. The emulation software may be referred to as ConfigSpace Emulation Software (CSES). The emulation module 336 may receive transactions, including configuration transactions, from the configuration management module 320, and may service those transactions. For example, servicing a configuration read transaction may include reading a configuration register from an emulated configuration space, and responding with the information read from the register. As another example, servicing a configuration write register may include updating the contents of the configuration register in the emulated configuration space. In some cases, a configuration write may be responded to with an acknowledgment that the write transaction completed.

In some implementations, the emulation module 336 may receive some or all configuration transactions directed to the peripheral device. In some implementations, the emulation module 336 may determine whether a configuration transaction is directed to the native configuration space 312 or the emulated configuration space 342. When a configuration transaction is directed to the native configuration space 312, the emulation module 336 may communicate with the PCIe core 310 to read or write the native configuration register. In some embodiments, configuration management module may handle native configuration register accesses without involving emulation module 336. When a configuration read is directed to emulation configuration 342, the emulation module 336 may read a value representing the contents of the configuration register from the emulated configuration space 342. When a configuration write is directed to emulated configuration space 342, the emulation module 336 may write or update data in the emulated configuration space 342 that represents the configuration register. In some implementations, the emulation module 336 may itself emulate one or more configuration registers internally. In such implementations, the emulation module 336 may read or write its internal representation of a configuration register, and may not need to access the emulated configuration space 342.

In some implementations, the emulation module 336 may make use of the PCI interrupt mechanism to process the emulated configuration register accesses. For example, the emulation module 336 may define the PCIe core 0 interrupt as a secure interrupt, and register a handler to this interrupt. An interrupt handler can be an independent software function that is triggered when an interrupt is received. When the PCIe core 0 interrupt is triggered, the emulation module 336 may be alerted and may begin servicing transactions from the configuration management module 320. By defining the PCIe core 0 interrupt as secure, the interrupt may be hidden, or masked from non-secure modules, such as the operating system module 332. In some embodiments, a secure interrupt may also interrupt a non-secure interrupt handler.

The memory 340 provides storage for data that may be operated on by the local hardware 330. The memory 340 may include DRAM, (e.g., SDRAM, DDR-SDRAM, etc.), SRAM, flash memory, or some other memory type or combinations thereof. In some embodiments, memory 340 can be implemented as an external memory module, or as an internal memory of the peripheral device 200, or a combination thereof. The memory 340 may store an emulated configuration space 342. The emulated configuration space 342 may include representations for all or some of the 4 KB of PCIe configuration addresses. In some implementations, the emulated configuration space 342 may include PCIe extended capability registers. For example, the emulated configuration space 342 may include Advanced Error Reporting capability registers, Virtual Channel capability registers, Device Serial Number registers, and/or Power Budgeting capability registers. Alternatively or additionally, the emulated configuration space 342 may include SR-IOV extended capability registers. In such cases, the emulated configuration space 342 may include capability registers that allow SR-IOV physical and virtual functions to be controlled. SR-IOV is discussed in further detail below.

In some implementations, the emulated configuration space 342 may be dynamically replaced and/or modified. For example, PCIe extended capabilities may be added or removed in emulated configuration space 342. In other implementations, the PCIe peripheral device 300 may include multiple emulated configuration spaces suitable for different virtual machines, different operating systems, and/or different device types.

Table 2 illustrates an example of an emulated configuration space 342. The offset describes an offset from the beginning of the emulated configuration space. The offset is given as a 12-bit hexadecimal value. The emulated configuration may include other information about each emulated configuration register. For example, some emulated configuration registers may be marked as read only, write only, or readable/writeable only by a root complex. As another example, some emulated configuration registers may be provided with a default or reset value. In some embodiments, emulated configuration space 342 may include representations for multiple sets of the configuration registers shown in Table 2. For example, in some embodiments, the PCIe peripheral device 300 can be used to implement a PCI switch, bridge, or hub which may provide connectivity for one or more PCI endpoints. In such scenarios, the emulated configuration space 342 may include representations for configuration registers of the switch, bridge, or hub, as well as configuration registers for each endpoint device associated with the switch, bridge, or hub.

TABLE 2

Example Emulated Configuration

| Offset | Description |
| --- | --- |
| 000h-003h | Vendor ID and Device ID |
| 004h-007h | Command and Status |
| 009h-00Bh | Class Code |
| 00Ch-00Ch | Cache Line Size |
| 00Dh-00Dh | Latency Timer |
| 010h-027h | Base Address Registers (BARs) 0-5. |
| 028h-02Bh | Cardbus Card Information Structure (CIS) Pointer |
| 02Ch-02Fh | Subsystem Vendor ID, Subsystem ID |
| 030h-033h | Expansion Read Only Memory (ROM) Base Address |
| 034h-03Bh | Capabilities Pointer |
| 03Ch-03Fh | Interrupt Line |
| 040h-041h | Power Management Capability Header |
| 042h-046h | Power Management Capability Body |
| 047h-06Fh | Power Management Capability Filler |
| 070h-077h | PCIe Capability Header |
| 078h-07Bh | PCIe Capability Control |
| 07Ch-0AFh | PCIe Capability |
| 0B0h-0B1h | MSI-X Capability Header |
| 0B2h-0B3h | MSI-X Capability Control |
| 0B4h-0BBh | MSI-X Capability Body |
| 0BCh-0FFh | MSI-X Capability Filler |
| 100h-103h | Alternative Routing ID-extended (ARI-X) Capability Header |
| 104h-107h | ARI-X Capability Body |
| 108h-13Fh | ARI-X Capability Filler |
| 140h-143h | Serial Number-extended (SN-X) Capability Header |
| 144h-14Bh | SN-X Capability Body |
| 14Ch-14Fh | SN-X Capability Filler |
| 150h-153h | PCIe-extended (PCIe-X) Capability Header |
| 154h-157h | PCIe-XCapability Body |
| 158h-1FFh | PCIe-X Capability Filler |
| 200h-203h | Advanced Error Reporting-extended (AER-X) Capability Header |
| 204h-247h | AER-X Capability Body |
| 248h-2FFh | AER-X Capability Filler |
| 300h-303h | SR-IOV-extended (SR-IOV-X) Capability Header |
| 304h-307h | SR-IOV-X Capability Capabilities |
| 308h-30Bh | SR-IOV-X Capability Control |
| 30Ch-323h | SR-IOV-X Capability Body |
| 324h-33Bh | SR-IOV-X Capability Bars |

As mentioned above, configuration transaction logging may be implemented to track incoming configuration transactions. The configuration transaction logging may maintain a log of some or all incoming configuration read and write transactions. In some implementations, the configuration transaction logging may use several registers to log a given configuration transaction. These registers may include an address registers, a data register, and a completion register.

The address register may be set when a configuration read or write transaction is transmitted to the configuration transaction logging. The address register may contain information necessary to identify the configuration register that is the target of the inbound configuration transactions. In some cases, the address register may be cleared when it is read by emulation module 336. As an example, the address register may include information such as a valid indicator indicating whether the address register is valid, a configuration type (e.g., type 0 or type 1), a target register offset, read/write indicator indicating whether the transaction is a read access or a write access, a device function field indicating which physical or virtual function is the target of the configuration access, and a target bus number. In some embodiments, setting the valid indicator may trigger an interrupt or low-latency notification to an emulation module to request the emulation module to service the configuration access request.

The data register may store data associated with the configuration transaction. For configuration write transactions, the data register may store the data to be written. For configuration read transactions, the data register may store the data read from the target configuration register by emulation module 336.

The completion register indicates the status of a configuration read or write transaction. The completion register may be written to by emulation module 336 when the emulation module 336 completes a configuration transaction. The values written to the completion register can be used to format a completion response that is sent to the initiator of the configuration transaction (e.g., a root complex). For example, the values in the completion register may be used to generate a completion indication. A completion indication may identify the bus number, device number, and/or function number of the peripheral device, and function that accepted and serviced the configuration transaction. In some cases, when the emulation module 336 writes to the completion register, the pending configuration transaction is considered complete and may be released. In some cases, the completion register may be only written once for each inbound configuration transaction.

As an example, the completion register may include information such as a completion status, a target bus number, a target device number, and a target function number. The completion status may indicate whether the configuration transaction completed successfully, the configuration transaction was invalid (e.g., the target function or target bus number may not exist), the configuration transaction should be retried (e.g., the peripheral device could not accept the configuration transaction, and the configuration transaction should be transmitted again by transaction's initiator), or the configuration transaction was aborted (e.g., the peripheral device accepted but could not complete the configuration transaction). The target bus number may indicate which bus number to use in the completion identifier (e.g., the target bus number provided in the address register is returned, or a bus number associated with target function is returned). For example, the peripheral device may reside on bus number 1. An inbound configuration transaction may be Configuration Type 1, and may be directed to bus number 2. In this case, the emulation module may return either bus number 1 or 2. The target device number may indicate which target device number to use in the completion identifier (e.g., the target device number provided in the address register is returned, or a target device number associated with the target function is returned). The target function number may indicate which target function number to use in the completion identifier (e.g., the target function number provided in the address register is returned, or a port function number is returned).

In addition to flexibility and configurability, a peripheral device with the emulated configuration techniques may also provide enhanced security, which may not be available to non-emulated peripheral devices.

For example, a peripheral device may be subject to a denial of service attack. In such an attack, a malicious virtual machine may flood the peripheral device with configuration transactions in an attempt to cause the device hardware and/or software to fail. However, a peripheral device with an emulation module may be able to track the rate of configuration accesses by the virtual machine (e.g., by monitoring the transaction log). The emulation module may thus detect an unusual increase in accesses by a virtual machine, and may deny any further accesses from that virtual machine.

As another example, a virtual machine may access an uninitialized or non-existent function. An ordinary peripheral device may hang in such cases. The emulation module, however, may capture such accesses, and respond appropriately by emulating configuration registers for the uninitialized or non-existent function, or recognizing that the access is to a non-existent function. The emulation module may thus prevent the peripheral device from hanging.

As yet another example, a virtual machine may initiate a reset of a function at an inappropriate time. The emulation module, however, may capture and log such software-based resets. The emulation module may subsequently process the reset at an appropriate time, for example, after allowing all pending transactions to complete. Alternatively, the emulation module may simply block the inappropriate reset.

As a last example, a virtual machine may attempt an invalid or untimely configuration change. For example, the virtual machine may attempt to change the speed or width of the bus link. The emulation module, however, may capture all configuration accesses, including these inappropriate configuration changes, and may reject these invalid or untimely configuration change accesses.

III. Configuration Transaction Processes

Figure 4:
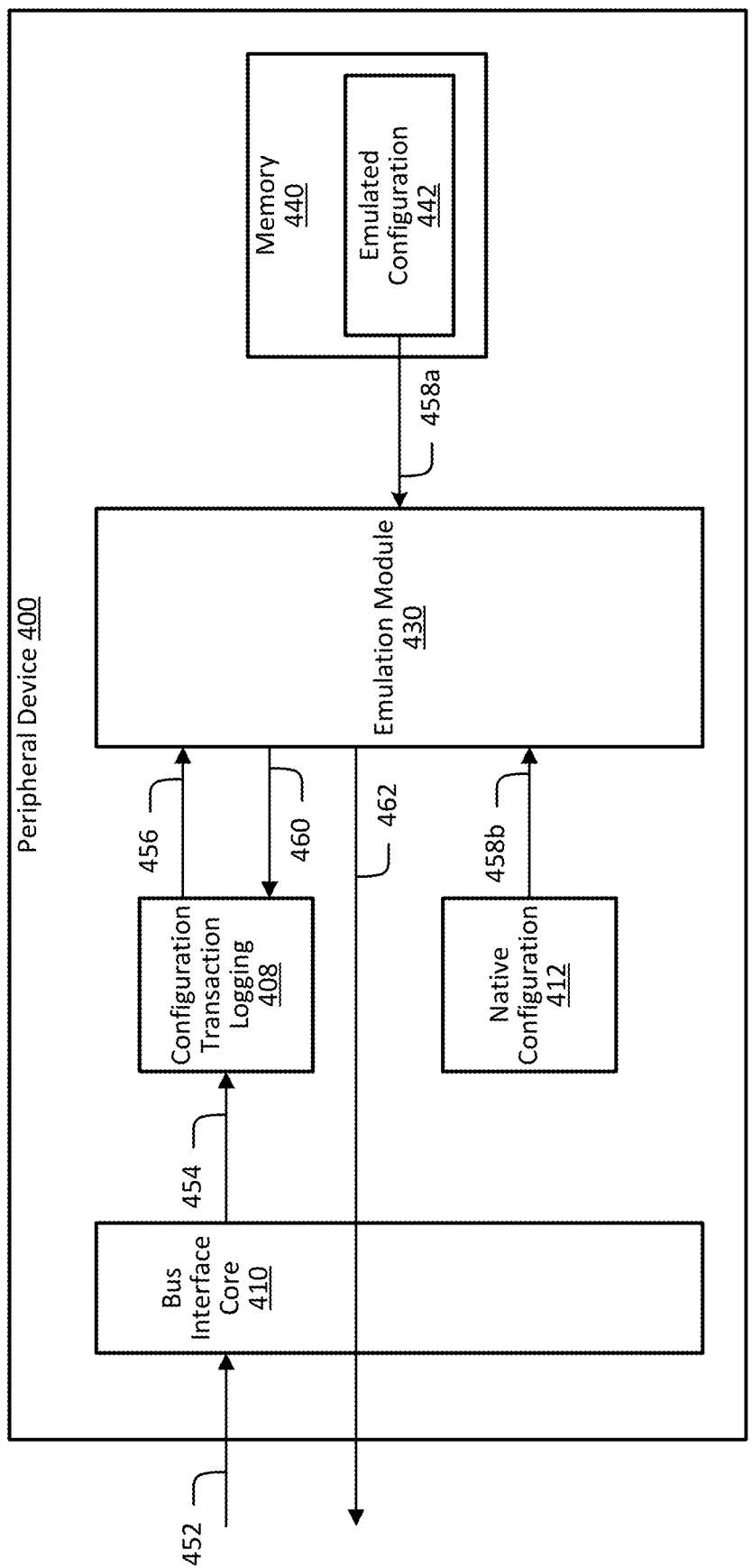
FIG. 4 illustrates an example of a peripheral device servicing a configuration read transaction, according to some embodiments.

FIG. 4 illustrates an example of a peripheral device 400 servicing a configuration read transaction. The peripheral device 400 of FIG. 4 may flexibly emulate other peripheral devices and/or multiple device functions. The peripheral device 400 may include a bus interface core 410, configuration transaction logging unit 408, native configuration space 412, an emulation module 430, and a memory 440.

The bus interface core 410 may include functionality for communicating with a bus that connects peripheral device 400 to a computing system. The bus interface core 410 may include a physical connection to the bus, and may provide hardware and/or software to manage the electrical connection to the bus, to decode incoming transactions and encode outgoing transactions, and/or to manage errors in incoming and outgoing transactions.

The configuration transaction logging unit 408 may track incoming configuration transactions. The configuration transaction logging unit 408 may maintain a log of some or all incoming configuration read and write transactions. The log may take the form of a list or table, or a combination of lists and/or tables. In some implementations, the configuration transaction logging unit 408 may assign priorities to incoming configuration transactions, so that some transactions may be serviced sooner than others. In such implementations, the configuration transaction logging unit 408 may also maintain coherency, that is, ensure that reads and writes happen in a proper order. For example, when a read transaction of a register is received after a write transaction for the same register, the write transaction must occur first. In other implementations, the configuration logging 408 maintains incoming transactions in the order that they were received.

The native configuration space 412 may include native configuration registers that are not being emulated by the peripheral device 400. Native configuration registers generally have physical addresses, and thus may occupy one or more address spaces.

The emulation module 430 can be implemented using one or more processors, one or more processor cores, a processor cluster, programmable gate arrays, or control logic circuitry adapted to process configuration transactions. The emulation module 430 may execute software code, such as an operating system and/or an emulation software, as described above. In some embodiments, the functionalities of the emulation software can be implemented in hardware (e.g., control logic circuitry). The emulation module 430 may service some or all incoming configuration read and write transactions, including both transactions targeting native configuration space 412 and transactions targeting emulated configuration space 442.

The memory 440 provides storage for data that may be operated on by the emulation module 430. The memory 440 may store an emulated configuration space 442. The emulated configuration space 442 may include representations for some or all of the configuration registers defined for one or more peripheral devices that are being emulated by peripheral device 400. In some implementations, emulated configuration space 442 may include primarily configuration registers that effect the operation of the peripheral device being emulated. The emulated configuration space 442 may be stored in the form of a text file, source code, object code, a script, or some other format. In some embodiments, the emulated configuration space 442 may be encrypted. In some implementations, the memory 440 may include more than one emulated configuration space. For example, a peripheral device may be emulating multiple other peripheral devices and/or multiple functions. In such cases, the memory 440 may include an emulated configuration space for each peripheral device being emulated, and/or for each function being emulated.

The example of FIG. 4 illustrates the steps that may be executed by peripheral device 400 when a configuration read transaction is received. At step 452, a configuration read transaction is received from the bus (e.g., from a root complex or a host). The bus interface core 410 may receive the configuration transaction, and determine that it should accept the transaction. The bus interface core 410 may examine, for example, a target bus identifier, device identifier, function identifier, and/or address in the transaction to make this determination. The peripheral device 400 may be emulating more than one peripheral device and/or more than one function. Hence, the bus interface core 410 may accept transactions for any number of peripheral devices that are being emulated.

At step 454, the bus interface core 410 may send the configuration read transaction to the configuration transaction logging unit 408. The configuration transaction logging unit 408 may add the read transaction to its transaction log. In some embodiments, once the read transaction has been logged, the bus interface core 410 may move on to other operations, and need not wait for the read transaction to be completed.

At step 456, the configuration transaction logging unit 408 may send an interrupt to the emulation module 430. The emulation module 430 may respond to the interrupt by invoking an emulation process. The emulation process may retrieve the configuration transaction from the configuration transaction logging unit 408, and service the configuration transaction. In some embodiments, the emulation module 430 may service the configuration transaction whenever it is ready to do so or according to an interrupt routine. In some embodiments, the emulation module 430 may include dedicated resources for servicing configuration transactions. For example, the emulation module 430 may have a processor core or execution thread designated for servicing configuration transactions. Additionally or alternatively, the configuration transaction logging unit 408 may send an interrupt to the emulation module 430 whenever a transaction is sent to the configuration transaction logging at step 454. The interrupt informs the emulation module 430 that it should act. In some cases, the emulation module 430 may also need to adhere to timing requirements dictated by the bus. For example, some bus protocols may expect that a peripheral device will respond to a read transaction within a certain time.

Configuration transactions may be fetched or received at step 456 in the same order in which they were received by the bus interface core 410 at step 452. Alternatively, the configuration transaction logging unit 408 may reprioritize logged transactions, so that higher priority transactions are serviced first.

Upon receiving or fetching a configuration read transaction, the emulation module 430 may determine whether the transaction is directed to the emulated configuration space 442 or to the native configuration space 412. This determination may be based on the address of the configuration register to be read, which may fall within emulated configuration space or native configuration space. In some cases, when the read transaction is directed to the emulated configuration space 442, the emulation module 430 may, at step 458*a*, read a value that represents the contents of the target configuration register from the emulated configuration space 442 in memory 440. In other cases, the emulation module 430 may determine that the target configuration register is not being emulated and is part of the native configuration space 412. In such cases, the emulation module 430 may, at step 458*b*, read a configuration register's content from the native configuration space 412.

Next, at step 460, the emulation module 430 may generate a response to the configuration read. In some implementations, the emulation module 430 may send the retrieved data to the bus interface core 410. In such implementations, the bus interface core 410 may package the read data for transmission on the bus, and transmit the packaged data. In other implementations, the emulation module 430 may package the read data before providing the data to the bus interface core 410.

At step 462, the emulation module 430 may, after step 462, update the configuration transaction logging unit 408 to indicate that the configuration read transaction is done. In some implementations, the emulation module 430 may remove the read transaction from the configuration transaction logging unit 408 after servicing the read transaction.

The peripheral device 400 may be a peripheral device that implements PCI. When the peripheral device 400 is a PCI peripheral device, the steps described above may be described as follows according to some embodiments.

At step 452, a configuration read Transaction Layer Packet (TLP) may be received, for example, from a root complex. The configuration read TLP may be received on a PCIe bus, and may be received by a PCIe core. The PCIe core may unpack the TLP and reduce the configuration request to a format that is more easily processed.

At step 454, the PCIe core may transfer the configuration read request to the configuration transaction logging. For example, the PCIe core may update an address register in the configuration transaction logging with the configuration read request information. The configuration transaction logging may add the configuration read request to its log of pending configuration transactions. After transferring the configuration read request to the configuration transaction logging, the PCIe core may be free to execute other operations.

At step 456, the configuration transaction logging may send an interrupt to the emulation module. Upon receiving the interrupt, the emulation module may invoke an emulation process, and the configuration transaction logging may wait for a response.

At step 458*a*, the emulation module may look up the emulated configuration register targeted by the configuration read transaction. The emulation module may access the emulated configuration space in the memory, and locate the requested emulated configuration register therein. Upon locating the requested emulated configuration register, the emulation module may read the value of the emulated configuration register. In some cases, servicing the read request to the emulated configuration register may require additional information from the hardware of the peripheral device. In these cases, the emulation module may read an additional configuration register, such as a physical port configuration register or a register in the native configuration space.

At step 460, the emulation module may transfer the value read from the emulated configuration register to the configuration transaction logging unit, and update the completion status as a successful completion in the configuration transaction logging unit. At step 462, the emulation module or the configuration transaction logging unit communicates the read value to the PCIe device core, and the PCIe device core subsequently packages and transmits the read value to the root complex. For example, the PCIe device core may transmit a Configuration Completion TLP to the root complex. In some embodiments, if the configuration read request cannot be completed, the emulation module may update the completion status accordingly.

Figure 5:
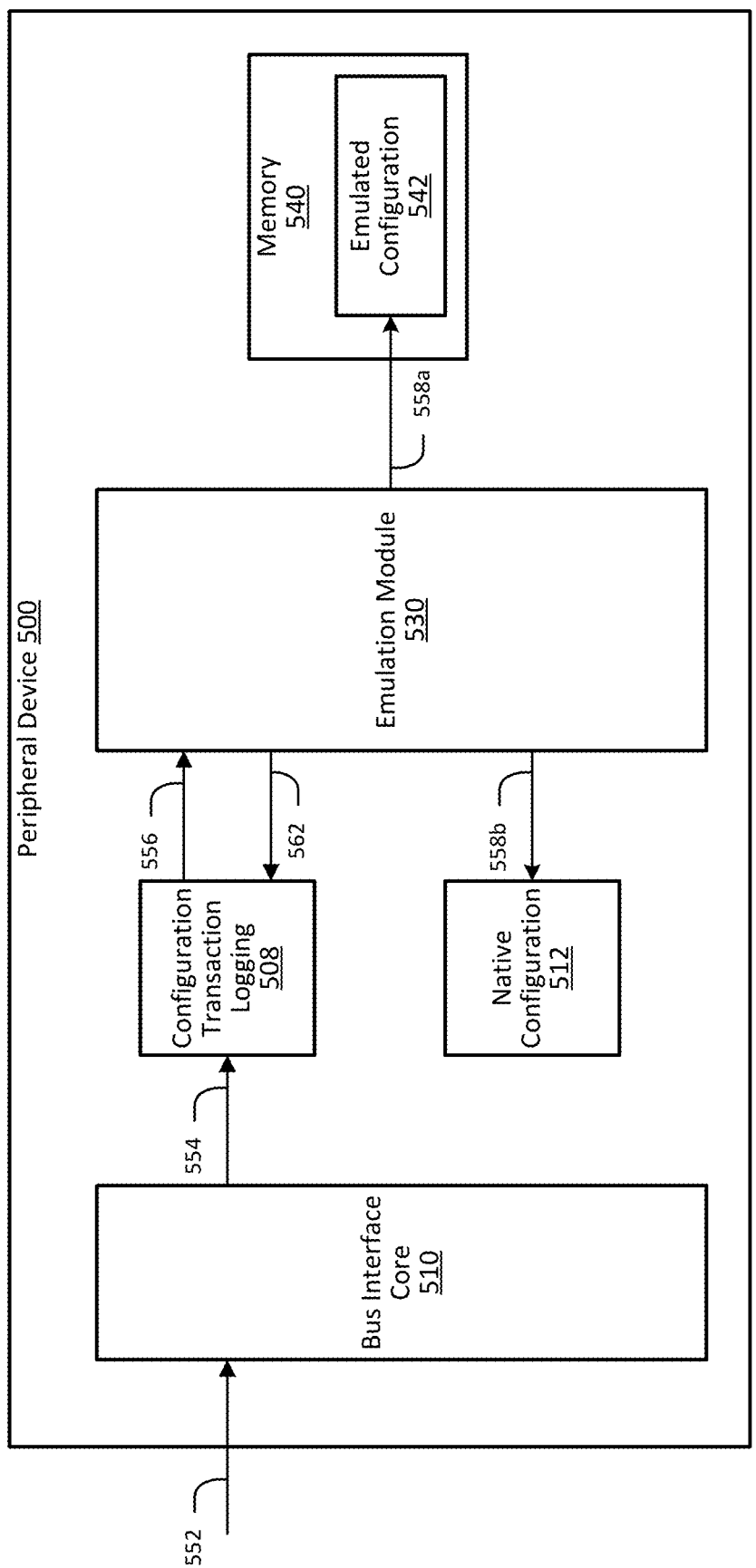
FIG. 5 illustrates an example of a peripheral device servicing a configuration write request, according to some embodiments.

FIG. 5 illustrates an example of a peripheral device 500 servicing a configuration write request. The peripheral device 500 may flexibly emulate different peripheral devices and/or multiple device functions. The peripheral device 500 may include a bus interface core 510, configuration transaction logging unit 508, native configuration space 512, an emulation module 530, and a memory 540. The bus interface core 510 may include functionality for communicating with a bus that connects the peripheral device to a computing system. The configuration transaction logging unit 508 may track incoming configuration transactions. The configuration transaction logging unit 508 may maintain a log of some or all incoming configuration read and write transactions. The native configuration space 512 may include configuration registers that are not being emulated by peripheral device 500. The emulation module 530 can be implemented using one or more processors, one or more processor cores, a processor cluster, programmable gate arrays, or control logic circuitry adapted to process configuration transactions. The emulation module 530 may execute software code, such as an operating system and/or an emulation module. In some embodiments, the functionalities of the emulation software can be implemented in hardware (e.g., control logic circuitry). The memory 540 provides storage for data that may be operated on by the emulation module 530. The memory 540 may include one or more emulated configuration spaces. An emulated configuration space 542 may include representations for some or all of the configuration registers defined for a peripheral device and/or function that is to be emulated. In some embodiments, the memory 540 may include an emulated configuration space 542 for each peripheral device and/or function that is to be emulated.

The example shown in FIG. 5 illustrates the steps that may be executed by the peripheral device 500 when a configuration write transaction is received. At step 552, a configuration write request is received from the bus (e.g., from a root complex or a host). The bus interface core 510 may receive the configuration write transaction, and determine that it should accept the transaction. The peripheral device 500 may be emulating more than one peripheral device and/or function. Hence, the device core 510 may accept transactions for any number of peripheral devices that are being emulated.

At a step 554, the bus interface core 510 may send the configuration write transaction to the configuration transaction logging 508. The configuration transaction logging 508 may add the configuration write transaction to its transaction log. Once the configuration write transaction has been logged, the bus interface core 510 may move on to other operations, and need not wait for the write transaction to be completed.

At a step 556, the configuration transaction logging 508 may send an interrupt to the emulation module 530. The emulation module 530 may respond to the interrupt by invoking an emulation module. The emulation module 530 may retrieve the configuration transaction from the configuration transaction logging 508, and service the configuration transaction. The emulation module 530 may service the configuration transaction whenever it is ready to do so. In some embodiments, the emulation module 530 may include dedicated resources for servicing configuration transactions. In some cases, the emulation module 530 may receive an interrupt whenever a configuration transaction is added to the configuration transaction logging unit 508 at step 554.

Upon receiving or fetching a configuration write transaction, the emulation module 530 may determine whether the transaction is directed to the emulated configuration space 542 or the native configuration space 512. In some cases, when the configuration write transaction is directed to the emulated configuration space 542, the process cluster 530 may, at step 558*a*, update the representation of the target configuration register in the emulated configuration space 542 with the write data. When the write transaction is directed to the native configuration space 512, the emulation module 530 may, at step 558*b*, update the configuration register in the native configuration space 512 with the write data.

At step 562, the emulation module 530 may update the configuration transaction logging unit 508 to indicate that the configuration write transaction is done. In some implementations, the emulation module 530 may remove the write transaction from the configuration transaction logging unit 508 after servicing the write transaction.

In some implementations, the emulation module 530 may generate a response to the write transaction, to indicate that the write transaction completed successfully. In these implementations, the emulation module 530 may instruct the bus interface core 510 to generate a response. Alternatively, the emulation module 530 may itself generate a response, and transmit the response to the bus.

The peripheral device 500 may be a peripheral device that implements PCI. When the peripheral device 500 is a PCI peripheral device, the steps described above may be described as follows, according to some embodiments.

At step 552, a configuration write TLP may be received from, for example, a root complex. The configuration write TLP may be received on a PCIe bus, and may be received by a PCIe core. The PCIe core may unpack the TLP and reduce the configuration request to a format that is more easily processed.

At step 554, the PCIe core may transfer the configuration write request to the configuration transaction logging, for example, by updating an address register with the configuration write request information. The configuration transaction logging may add the configuration write request to its log of pending configuration transactions. After transferring the configuration write request to the configuration transaction logging unit, the PCIe core may be free to execute other operations.

At step 556, the configuration transaction logging unit may send an interrupt to the emulation module. Upon receiving the interrupt, the emulation module may invoke an emulation module, and the configuration transaction logging unit may wait for a response.

At step 558*a*, the emulation module may look up the emulated configuration register that is to be written by the configuration write transaction. The emulation module may access the emulated configuration space in the memory, and locate the requested emulated configuration register therein. Upon locating the target emulated configuration register, the emulation module may update the emulated configuration register in the emulated configuration space with the write data. In some cases, the value written to the emulated configuration register may require updates to the hardware of the peripheral device 500. In these cases, the emulation module may write an additional configuration register, such as a physical port configuration register or a register in the native configuration space.

At step 562, the emulation module may update a completion status in the configuration transacting logging. This completion status may indicate that the configuration write transaction completed successfully. The configuration transaction logging may communicate the completion status to the PCIe device core. The PCIe device core may indicate successful completion to the root complex. For example, the PCIe device core may transmit a Configuration Completion TLP to the root complex. In some embodiments, if the configuration write request cannot be completed, the emulation module may update the completion status accordingly.

FIGS. 4-5 illustrate an example of how a peripheral device with an emulated configuration space may service configuration read and write transactions. The emulated configuration space can be modified and/or replaced, thereby modifying and/or replacing the peripheral device and/or functions being emulated. Furthermore, the emulation configuration space of the peripheral device may include multiple emulated configurations, so that the peripheral device can emulate multiple devices and/or functions. The emulation techniques may thus enable construction of peripheral devices with flexible and adaptable configuration spaces, and, in some cases, reduce or eliminate fixed and unchangeable configuration definitions of peripheral devices.

IV. SR-IOV

Figure 6:
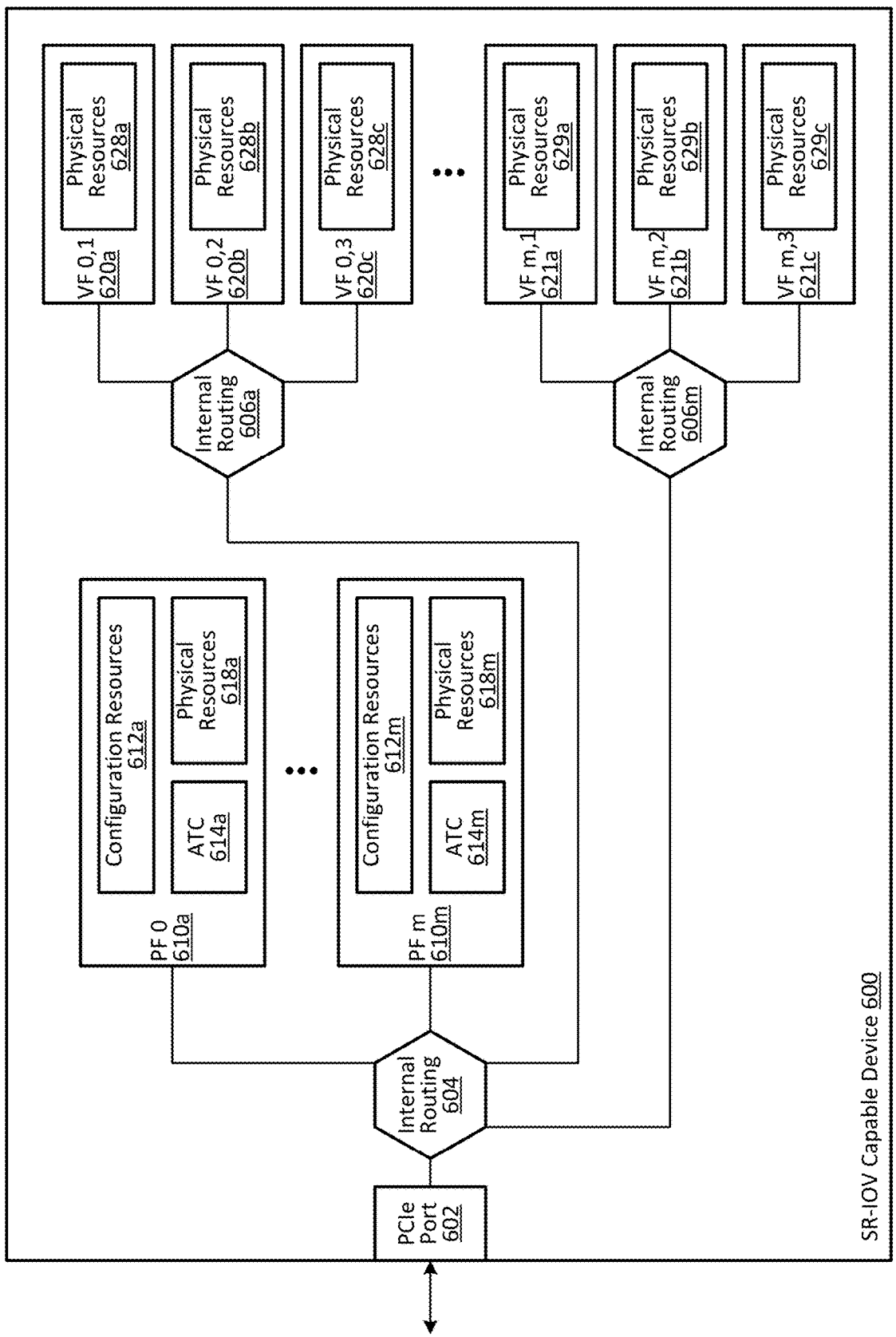
FIG. 6 illustrates a block diagram of a peripheral device configured to implement Single Root Input/Output Virtualization (SR-IOV), according to some embodiments.

FIG. 6 illustrates an example of a peripheral device 600 with Single Root Input/Output Virtualization (SR-IOV) capabilities. SR-IOV is an extended capability that allows a physical resource (e.g., a single network interface controller) to appear as multiple resources (e.g., sixty-four network interface controllers). Thus, a peripheral device providing a certain functionality may appear to be multiple devices providing that functionality. The functions of a SR-IOV capable peripheral device may be classified as physical functions (PFs) and virtual functions (VFs). Physical functions are full feature functions of the device that can be discovered, managed, and manipulated. Physical functions have configuration resources that can be used to configure or control the peripheral device. Physical functions include the same configuration address space and memory address space that a non-virtualized device would have. A physical function may have a number of virtual functions associated with the physical function. Virtual functions are similar to physical functions, but are light-weight functions that lack configuration resources, and are generally controlled by the configuration of their underlying physical functions. Each of the physical functions and/or virtual functions may be assigned to a respective thread of execution (such as for example, a virtual machine) running on a computing system.

The example SR-IOV capable device 600 shown in FIG. 6 may include a PCIe port 602, internal routing 604 and 606a-m, one or more physical functions 610a-m, and one or more virtual functions (e.g., 620a-c, 621a-c) per physical function 610a-m. The PCIe port 602 may provide a physical connection to a PCIe bus. Internal routing 604 and 606a-m may direct bus transactions to the appropriate physical functions 610a-m, and virtual functions. Each physical function 610a-m may be connected to the PCIe port 602 through the internal routing 604. Each virtual function may be connected to the PCIe port 602 through a first level of internal routing 606a-m, and then through a second level of internal routing 604. The internal routing 604 may provide point-to-point connectivity between each physical function 610a-m and the PCIe port 602, or any virtual function 6120a-f and the PCIe port 602.

Each physical function 610a-m may be associated with physical resources to implement their respective physical functions. For example, PF 0 610a may be associated with physical resources 618a, and PF m 610m may be associated with physical resources 618m. Each of the virtual functions may also be associated with respective physical resources to implement the functionality of the virtual function. Each physical function 610a-m may also include respective configuration resources 612a-m and respective address translation caches (ATCs) 614a-m. Each of the configuration resources 612a-m may include, for example, 4 KB configuration address space. Each of the address translation caches 614a-m may store recently used address translations. The physical function 610a-m may provide address translation when the address space visible to a computing system is different than the physical address space of attached peripheral device. For example, a virtual machine accessing a location may use a virtual address that gets translated to a physical address.

In some embodiments, the configuration registers associated with SR-IOV can be emulated in the emulated configuration space of a peripheral device. Each physical function may include a certain number of base address registers (BARs). Base address registers are configuration registers specify the address ranges of the physical function's I/O and/or memory address ranges. The value stored in a base address register may be modified as needed, to change the address space assigned to the physical function. Base address registers may be included in the emulated configuration space. The emulated configuration space may include, for example, representations for six BARs associated with the physical function, six BARs for the SR-IOV capability, and one BAR to store the address for an Expansion Read Only Memory (ROM) (in cases where the peripheral device incorporates a device ROM). In some implementations, the base address register of the emulated configuration space of a physical function may have a default value.

The physical function emulated configuration space may also include representations of SR-IOV capability registers. In some cases, the SR-IOV-capability registers may be at an offset that can be read from a capability list in the physical function emulated configuration space. Alternatively or additionally, the emulation module may maintain a local copy of this offset, so that the emulation module may access the SR-IOV capability registers without first reading the capability list.

In some implementations, changes to settings in the SR-IOV capability registers (e.g., configuration writes) may require the virtual functions to be disabled. For example, changes to the number of virtual functions and/or to base address registers for the virtual functions may require that the virtual functions be disabled. In some cases, disabling the virtual functions and re-enabling the virtual functions may cause the virtual functions to be reset. When the settings in an SR-IOV capability register are changed, the physical function may reset all active virtual functions. The physical function may further read the modified SR-IOV capability register, and determine which setting has changed. The physical function may then, if necessary, update the virtual functions' configuration based on the modified settings in the SR-IOV capability registers.

In some implementations, the emulated configuration space for a physical function and its associated virtual functions may be part of a configuration image organized into a physical function configuration space at a first address offset, a virtual function configuration space at a second address offset, and an additional configuration image at a third address offset.

The emulated configuration space for SR-IOV may include at least three components: SR-IOV capability configuration space for each physical function; configuration space for maintaining the state and capabilities of each virtual function; and configuration space for SR-IOV base address registers (BARs). In some implementations, accesses to the physical function emulated configurations and virtual function emulated configurations can be handled by catching and handling configuration space accesses that reach the PCIe core. The SR-IOV base address registers may, in some implementations, be implemented using base address registers in the native configuration space, for example, by reserving at least one pair of base address registers in the native configuration space.

In some embodiments, changes to specific bits in the configuration space such as Function Level Reset (FLR), Bus-Master Enable (BME), Memory Space Enable (MSE), etc. are communicated to the application utilizing the corresponding physical functions and associated virtual functions. For example, the application may receive and acknowledge FLR requests, and the emulation module may hold off on responding to any transaction to a function pending FLR until the application acknowledges the FLR is complete. The application may check the status of each function (FLR, BME, MSE, etc.) before executing any command. The application may inform the emulation module if there are pending transactions to each function, and check various settings configured to the configuration space, such as BARs, number of virtual functions, etc.

In some embodiments, the status (can also be referred to as function properties) of the physical functions and associated virtual functions can be maintained in the emulated configuration space and communicated to the application or emulation module. The size of the memory space for tracking the status of each function can be, for example, a 4-byte integer per physical or virtual function. The first integer may provide the status of the physical function, and the second integer may provide the status of the first virtual function, and so on.

The status of each function may include information that does not require immediate application response, but are properties that the application should inspect during I/O processing. For example, if a function is pending FLR, any command received for it should be discarded. As another example, if the BME is not set, the application should avoid posting DMA transactions to the function. In some embodiments, the status of each function may provide information such as whether the function is enabled (physical functions can be always enabled), whether the function has a FLR pending, whether MSE is enabled (for physical function), whether BME is enabled, and whether MSI-X is enabled.

The following provides an example of performing a Function Level Reset. Function Level Reset provides a mechanism for resetting a specific physical function and its associated virtual functions. Generally, resetting a physical function may trigger a reset of the virtual functions associated with the physical function. Function Level Reset is a gradual mechanism, and allows the virtual and physical functions to complete pending operations and enter a quiet or idle state. Once the functions are in a quiescent state, they may be reset.

The emulation module may receive a Function Level Reset request identifying the physical function to reset. The associated virtual functions may first be put into a quiescent state. The emulation module may indicate that the virtual functions are being reset by setting the FLR bit in the function properties for the virtual functions. The emulation module may next send a FLR message to the application queue, and any further request to the virtual function will be responded with a "Unsupported Request" response until the application acknowledges the FLR. Once the virtual function has completed any pending transactions, the application will acknowledge the Function Level Reset request. The application may then send a message to the queue for the emulation module. When the emulation module receives a configuration access request, the emulation module polls the queue and receives the FLR acknowledgment. The emulation module may then respond to further requests to the virtual function. The status or properties of the virtual function may be updated. For example, the MSI-X and BME can be disabled.

For a physical function, upon receiving the Function Level Reset, the emulation module may disable the Memory Space and Bus Master via the MSE and BME status bits. Furthermore, the emulation module may revert all emulated and native configuration registers to default values. The emulation module may further send a FLR message to the application queue, and any further requests to the physical function will be responded with a "Unsupported Request" response until instructed otherwise by the application. The application may reset its physical function data structures and pending transaction queues. Upon completing these operations, the application may acknowledge the Function Level Reset request by sending a message to the queue for the emulation module. When the emulation module receives a configuration access request, the emulation module polls the queue and receives the FLR acknowledgment. The emulation module may then respond to further requests to the physical function. All virtual functions associated with the physical function may be disabled until re-enabled by a root complex.

The following example illustrates emulation of SR-IOV capability by a peripheral device. The peripheral device may include, for example, one physical function, designated as PF0. The emulated configuration for PF0 includes SR-IOV extended capability registers. Furthermore, PF0 may be used by the peripheral device to discover, configure, and manage virtual functions associated with PF0. Generally, the emulated SR-IOV registers may be uploaded to the peripheral device with the same default values as defined by the SR-IOV protocol. In some implementations, the SR-IOV registers may be uploaded with other values. For example, the total number of virtual functions assigned to PF0 may be set to 4K, the default offset to the first virtual function within the emulated SR-IOV registers may be set to 257, and the default virtual function stride may be set to 1.

In this example, the virtual functions may include the MSI-X capability. Furthermore, both the physical functions and the virtual functions may include the Advanced Routing Identification (ARI) capability. ARI provides a mechanism that allows a peripheral device to support more than eight functions. Peripheral devices that support ARI may interpret the Device ID field in the PCI configuration header as part of the function number. This gives the peripheral device the ability to support up to 256 functions.

In some implementations, the SR-IOV control register indicates whether the ARI Capable Hierarchy is enabled. Enabling the ARI Capable Hierarchy allows, for example, virtual functions to use function numbers 8 to 255. The ARI Capable Hierarchy setting also indicates that ARI has been enabled in the root complex or in a switch immediate upstream from the peripheral device. The root complex may set the ARI Capable Hierarchy setting to match the ARI Forwarding Enable setting in the root complex or in the switch. The peripheral device may use the configuration of the ARI Capable Hierarchy setting to determine the offset of the first virtual function. For example, the default offset to the first virtual function can be set 257, for both ARI and non-ARI modes.

Generally, before the PCI hierarchy included in a computing system is enumerated by the root complex, bus and device numbers are not assigned. During the enumeration process, the emulation module may refrain from responding to configuration accesses that are not targeting PF0. This is because the peripheral device may not want to give the root complex the impression that the peripheral device includes more than one physical function. After the functions and devices in the computing system have been mapped by the root complex, the root complex may enable the ARI Capability Hierarchy setting, as well as setting the virtual function enable setting in the SR-IOV configuration registers.

In some cases, the emulation module may capture the transaction that enables virtual functions. In these cases, once virtual functions have been enabled, the emulation module may be able to accept configuration transactions targeting bus numbers, device numbers, and function numbers other than are assigned to PF0.

In some implementations, the peripheral device may emulate virtual functions as located on higher bus numbers than the bus number for the physical function. In these implementations, configuration accesses to the virtual functions maybe Configuration Type 1, meaning that the configuration access should be bridged to a higher number bus. Table 3 provides an example of how various configuration transactions in this example may be processed. The configuration transactions may Configuration Type 0 (directed to a local bus) or Configuration Type 1 (directed to a higher level bus, and should be bridged in order to reach that bus). The target bus may be the one that the example peripheral device is located on, or may be a bus number that is higher. Given the Configuration Type and target bus, the table indicates whether the configuration transaction may target the physical function and/or any associated virtual functions. Lastly, the table indicates how the peripheral device may respond to these configuration transactions.

TABLE 3

Example configuration transactions and responses.

| Configuration Type (0/1) | Target Bus | Allowed Target Function | Response |
|---|---|---|---|
| 0 | Same as PF | PF or VF | Successful; completer identifier may be updated. |
| 1 | Same as PF | PF or VF | Unsupported Request. |
| 0 | Higher than PF | PF | Successful; completer identifier may be updated. |
| 1 | Higher than PF | VF | Successful; generally, completer identifier is not updated. |

In cases where the configuration transaction targets a bus number that is not assigned to either the physical function or any of the virtual functions, the peripheral device may respond with an Unsupported Request.

Table 4 provides an example of bus assignments for different numbers of virtual functions.

TABLE 4

Example bus assignments.

| Number of VFs | ARI Capable Hierarchy | Mapping |
|---|---|---|
| 128 | Enabled | All virtual functions are mapped to the same bus number as the physical function. |
| 128 | Disabled | All virtual functions are mapped to the bus number of the physical function, plus 1 (e.g., if PF0 is on bus 0, the virtual functions are on bus 1). |
| 4096 | Enabled | The first 255 virtual functions can be mapped to the bus number of the physical function; the remaining virtual functions are mapped sequentially starting at the bus number of the physical function, plus 1 (e.g., if PF0 is on bus 0, VF256 is on bus 1, VF257 is on bus 2, VF258 is on bus 3, etc.). |

Bus assignments and which physical and virtual functions are available can be learned by reading the emulated configuration for the physical and virtual functions. When a configuration transaction for a non-existent function is received, the emulation module may respond with an Unsupported Request response.

Table 5 provides an example of responses based on whether virtual functions are enabled, and whether ARI Capable Hierarchy is enabled.

TABLE 5

Example responses for various configuration combinations.

| VF Enable | ARI Capable Hierarchy | Configuration Type (0/1) | Response |
|---|---|---|---|
| No | Disabled | 0 | Successful if targeted to PF; Unsupported Request otherwise. |
|  |  | 1 | Unsupported Request for all accesses. |
| No | Enabled | 0 | Successful if targeted to PF; Unsupported Request otherwise. |
|  |  | 1 | Unsupported Request for all accesses. |
| Yes | Enabled | 0 | Successful if targeted to PF and VFs that are mapped to the same bus as the PF; Unsupported Request otherwise. |
| Yes | Disabled | 0 | Successful if targeted to PF; Unsupported Request otherwise. |
|  |  | 1 | Successful if targeted to VFs that are mapped to bus numbers that are higher than the bus number of the PF; Unsupported Request otherwise, because the function number and/or bus number is not mapped to an existing function. |

V. Methods

Figure 7:
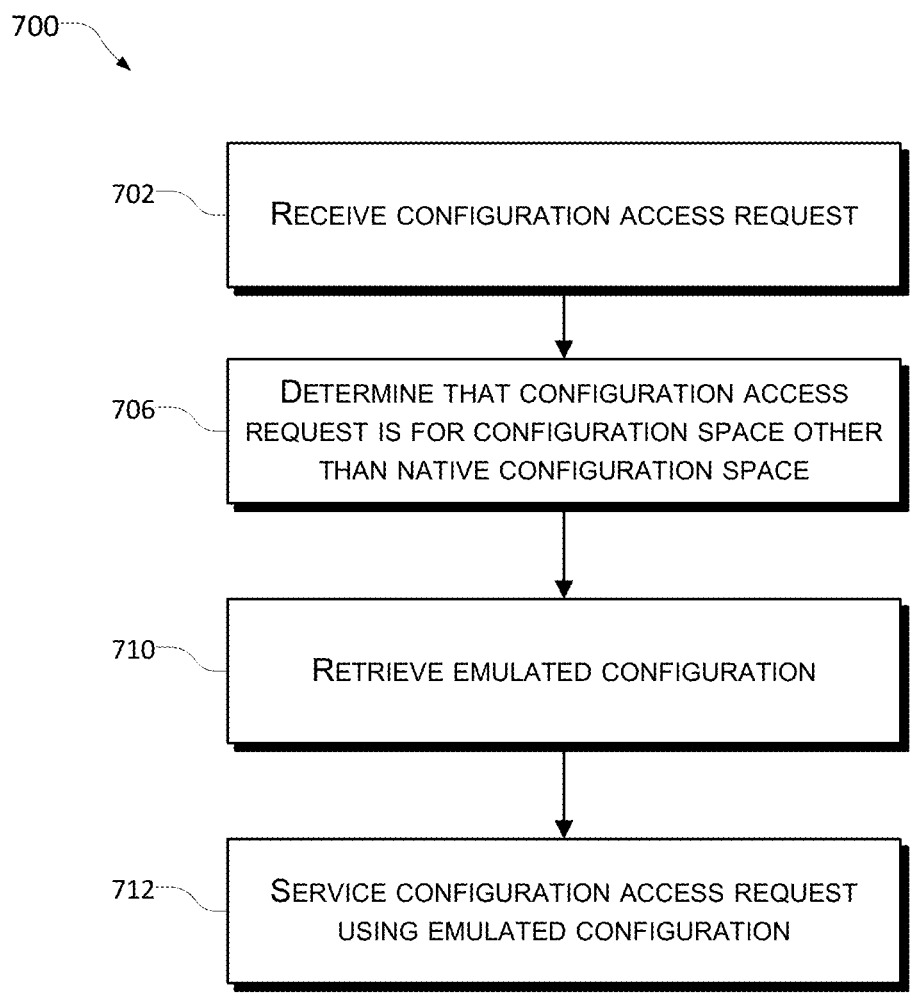
FIG. 7 illustrates a flow diagram for servicing a configuration access request, according to some embodiments.
Figure 8:
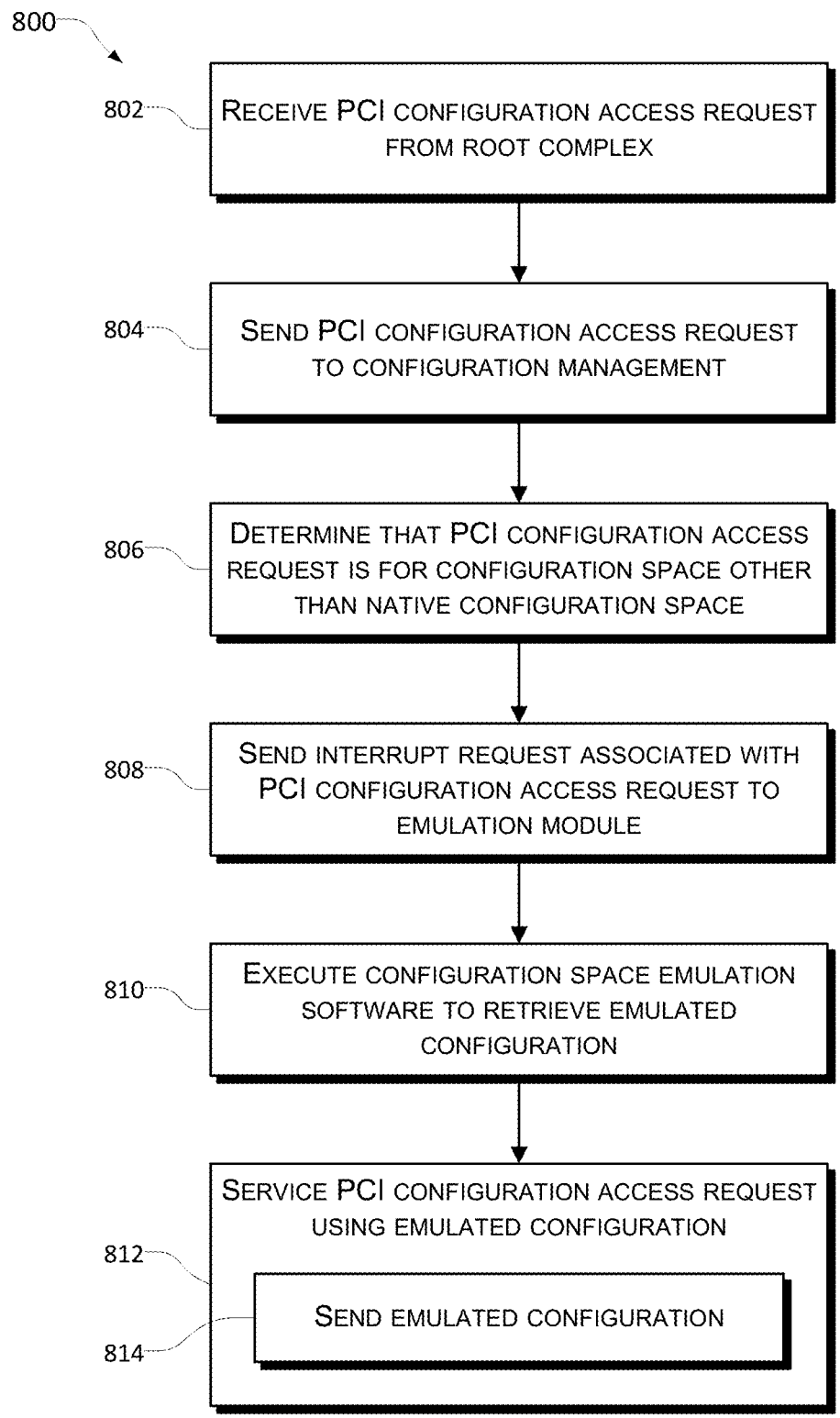
FIG. 8 illustrates an example of a process for servicing a configuration access request to read a configuration register, according to some embodiments.
Figure 9:
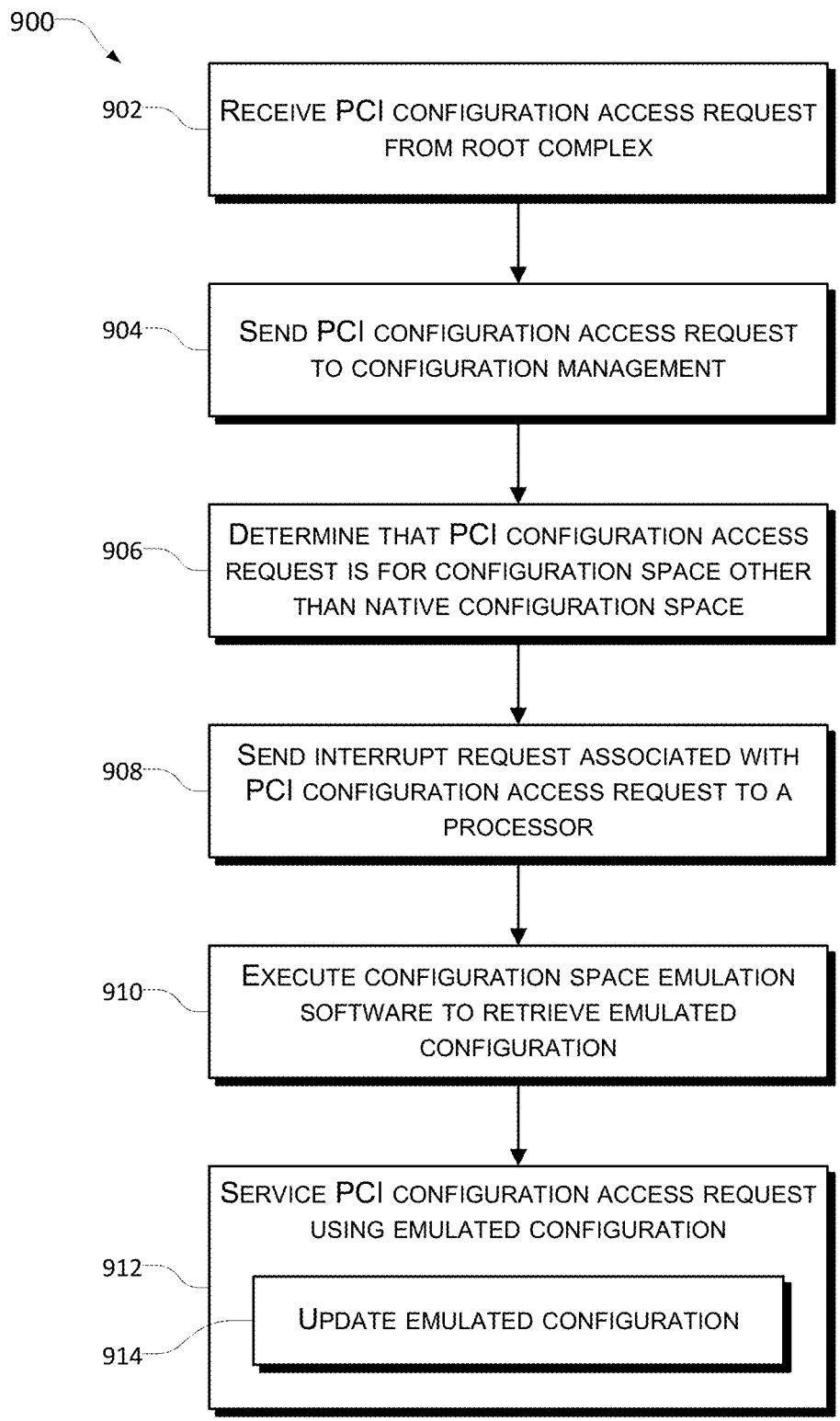
FIG. 9 illustrates an example of a process for servicing a configuration access request to write a configuration register, according to some embodiments.

FIGS. 7-9 illustrate embodiments of methods for emulating the configuration space of a peripheral device. These methods may be implemented by the systems described above.

FIG. 7 illustrates a process 700 for servicing a configuration access request. The configuration access request may be received by a peripheral device that includes an emulated configuration space. An emulated configuration space may allow the peripheral device to emulate one or more different peripheral devices and/or functions. A configuration access request may be a request to read a configuration register and/or write a configuration register.

At step 702, a peripheral device may receive a configuration access request. The configuration access request may be received over a bus. The configuration access request may include information that identifies the target of the configuration access request. For example, the configuration access request may include a bus identifier, a device identifier, a function identifier, and/or an address. This identification information may indicate whether a peripheral device should accept and service the configuration access request. In some implementations, a peripheral device may emulate multiple peripheral devices and/or functions. In such implementations, the peripheral device may accept configuration access requests for more than one peripheral device and/or function.

At step 706, the peripheral device may determine that the configuration access request is for configuration space other than the native configuration space of the peripheral device. The configuration access request may be for a configuration register that is in an address space that is being emulated. Configuration access requests that are for native configuration spaces may be processed differently than is illustrated by the process 700. For example, configuration access requests to native configuration may be handled by native hardware in the peripheral device, such as the bus interface core of the peripheral device.

At step 710, the peripheral device may retrieve an emulated configuration from an emulated configuration space. The emulated configuration may include representations for one or more configuration registers. In some implementations, the emulated configuration space includes emulated configuration headers and/or registers (which may be referred to as emulated configuration) for more than one function. In such implementations, the peripheral device may determine a target function for the configuration access request, and retrieve the appropriate emulated configuration.

At step 712, the peripheral device may service the configuration access request using the emulated configuration. Servicing the configuration access request may include identifying the register that the configuration access request is requesting access to. In some implementations, servicing the configuration access request may include providing the emulated configuration to the source of the configuration access request. In such implementations, the peripheral device may read a representation of the identified configuration register from the emulated configuration. In other implementations, servicing the configuration access request may include updating the emulated configuration. In such implementations, the peripheral device may write or update the representation of the identified configuration register in the emulated configuration.

FIG. 8 illustrates an example of a process 800 for servicing a configuration access request to read a configuration register. The process 800 is illustrated using PCI as an example of a bus protocol that may be implemented by a peripheral device. The peripheral device may be implementing a PCI emulated configuration space. A PCI emulated configuration space may allow the peripheral device to emulate one or more PCI devices and/or functions. In some embodiments, the process 800 may be implemented with other bus protocols, such as in cases where a peripheral device is using an emulated configuration space tailored for a different bus protocol.

At step 802, the PCI core of the peripheral device may receive a PCI configuration access request from a root complex. The configuration access request may include information that identifies the target of the configuration access request. The identification information may indicate whether the peripheral device should accept and service the configuration access request. The peripheral device may emulate multiple peripheral devices and/or functions. In such implementations, the peripheral device may accept configuration access requests for more than one peripheral device and/or function.

At step 804, the PCI core of the peripheral device may send the PCI configuration access request to a configuration management module in the peripheral device. The configuration management module may maintain a log of configuration access requests. The log may keep track of configuration access requests that have been received by the peripheral device.

At step 806, the configuration management module may determine that the PCI configuration access request is targeted to a configuration space other than a native configuration space. Native configuration space may include configuration registers for basic functionality such as bus speed selection that may be unnecessary and/or undesirable to emulate. Configuration space other than a native configuration space may be emulated. Emulated configuration space may be represented using emulated configuration headers.

At step 808, the configuration management module of the peripheral device may send a low latency notification (e.g., an interrupt request) to an emulation module (which can be implemented as, e.g., a processor, control logic circuitry, etc.) in the peripheral device. The interrupt may notify the emulation module in the peripheral device that the configuration access request has been received, and/or that the emulation module should service the configuration access request.

At step 810, the emulation module of the peripheral device may respond to the interrupt request (e.g., by executing configuration space emulation software to process the configuration access request). The emulation module may retrieve an emulated configuration from an emulated configuration space. In some implementations, the peripheral device may be emulating one or more peripheral devices and/or functions. In such implementations, the configuration access request may include the identity of a target emulated peripheral device and/or function. Furthermore, the configuration space emulation software may retrieve the configuration for the targeted emulated peripheral device and/or function. In some implementations, the emulated configuration space is stored in DRAM or can be emulated internally. A persistent memory can also be used to store the emulated configuration space such that the emulated configuration space is retained in memory during loss of power. In some embodiments, the emulation configuration space stored in the persistent memory can be loaded to a DRAM or local memory at startup to provide faster access to the emulation configuration space. In some implementations, the configuration space emulation software is executed in an isolated environment. In an isolated environment, the configuration space emulation software may be able to execute securely, without intervention or interference from other software.

At step 812, the PCI configuration access request may be serviced using the retrieved emulated configuration. In some implementations, the configuration access request may be a configuration read request. In such implementations, the process 800 may include a step 814, in which servicing the configuration access request may include sending, to the PCI root complex, the retrieved emulated configuration. In some embodiments, if the emulated configuration being read includes a type of register that changes its state upon being read (e.g., clear-on-read register, or has clear-on-read bits), process 800 may also modify the contents of the emulated configuration as part of servicing the configuration access request.

FIG. 9 illustrates an example of a process 900 for servicing a configuration access request to write a configuration register. The process 900 is illustrated using PCI as an example of a bus protocol that may be implemented by a peripheral device. The peripheral device may be implementing a PCI emulation system. A PCI emulation system may allow the peripheral device to emulate one or more PCI devices and/or functions. The process 900 may be implemented with other bus protocols, such as in cases where a peripheral device is using an emulation system that uses a different bus protocol.

At step 902, the PCI core of the peripheral device may receive a PCI configuration access request from a root complex. The configuration access request may include information that identifies the target of the configuration access request. The identification information may indicate whether the peripheral device should accept and service the configuration access request. The peripheral device may emulate multiple peripheral devices and/or functions. In such implementations, the peripheral device may accept configuration access requests for more than one peripheral device and/or function.

At step 904, the PCI core of the peripheral device may send the PCI configuration access request to a configuration management module in the peripheral device. The configuration management module may maintain a log of configuration access requests. The log may keep track of configuration access requests that have been received by the peripheral device.

At step 906, the configuration management module may determine that the PCI configuration access request is targeted to a configuration space other than a native configuration space. Native configuration space may include configuration registers for basic functionality such as bus speed selection that may be unnecessary and/or undesirable to emulate. Configuration space other than a native configuration space may be emulated. Emulated configuration space may be represented using emulated configuration headers.

At step 908, the configuration management module of the peripheral device may send a low-latency notification (e.g., an interrupt request) to an emulation module in the peripheral device. The interrupt may notify the emulation module in the peripheral device that the configuration access request has been received, and/or that the emulation module should service the configuration access request.

At step 910, the emulation module of the peripheral device may respond to the interrupt request (e.g., execute configuration space emulation software). The emulation module may retrieve an emulated configuration from an emulated configuration space. In some implementations, the peripheral device may be emulating one or more peripheral devices and/or functions. In such implementations, the configuration access request may include the identity of a target emulated peripheral device and/or function. Furthermore, the configuration space emulation software may retrieve the configuration for the targeted emulated peripheral device and/or function. In some implementations, the emulated configuration space is stored in DRAM or can be emulated internally. A persistent memory can also be used to store the emulated configuration space such that the emulated configuration space is retained in memory during loss of power. In some embodiments, the emulation configuration space stored in the persistent memory can be loaded to a DRAM or local memory at startup to provide faster access to the emulation configuration space. In some implementations, the configuration space emulation software is executed in an isolated environment. In an isolated environment, the configuration space emulation software may be able to execute securely, within intervention or interference from other software.

At step 912, the PCI configuration access request may be serviced using the emulated configuration header. In some implementations, the configuration access request may be a configuration write request. In such implementations, the process 900 may include a step 914, in which servicing the configuration access request may include updating the emulated configuration.

Some or all of the processes illustrated in FIGS. 7-9 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Generally, any of the components, systems, and peripherals disclosed herein can be implemented partially or fully in hardware or in a combination of hardware and software. The hardware can include electronic circuits such as a system-on-chip (SoC), an application-specific integrated circuit (ASIC), a processor, or a field-programmable gate array (FPGA).

VI. Computer Systems

Figure 10:
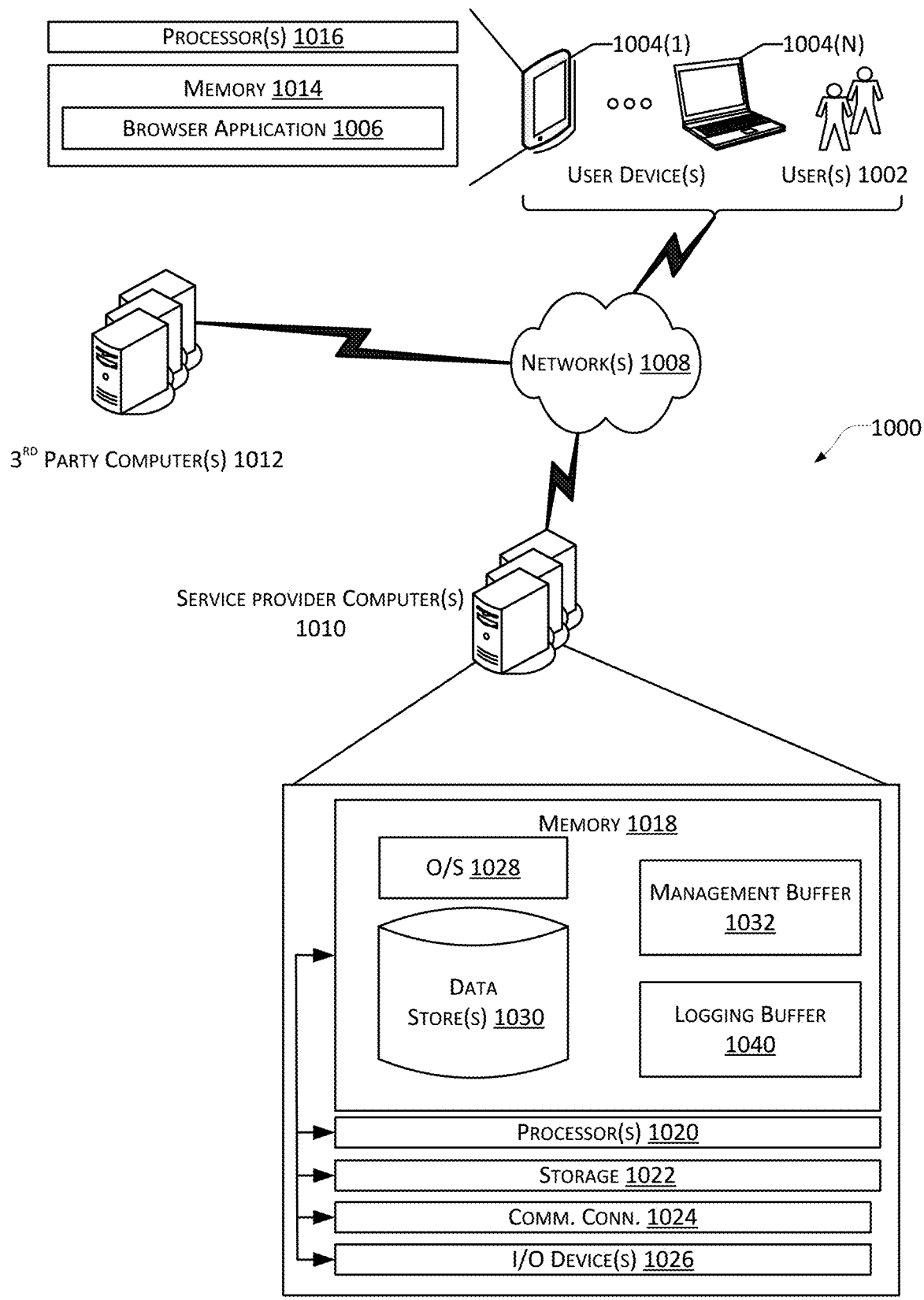
FIG. 10 illustrates an example architecture for features and systems described herein that includes one or more service provider computers and/or a user device connected via one or more networks, according to some embodiments.

FIG. 10 illustrates an example architecture for features and systems described herein that includes one or more service provider computers and/or a user device connected via one or more networks, according to at least one example embodiment. The devices discussed in FIGS. 1-14, may use one or more components of the computing devices described in FIG. 10 or may represent one or more computing devices described in FIG. 10. In the illustrated architecture 1000, one or more users 1002 may use user computing devices 1004(1)-(N) to access an application 1006 (e.g., a web browser or mobile device application), via one or more networks 1008. In some aspects, the application 1006 may be hosted, managed and/or provided by a computing resources service or service provider. One or more service provider computers 1010 may provide a native application which is configured to run on the user devices 1004 which user(s) 1002 may interact with. The service provider computer(s) 1010 may, in some examples, provide computing resources such as, but not limited to, client entities, low latency data storage, durable data storage, data access, management, virtualization, cloud-based software solutions, electronic content performance management, etc. The service provider computer(s) 1010 may also be operable to provide web hosting, computer application development and/or implementation platforms, combinations of the foregoing or the like to the user(s) 1002. The service provider computer(s) 1010, in some examples, may communicate with one or more third party computers 1012.

In some examples, network(s) 1008 may include any one or a combination of many different types of networks, such as cable networks, the Internet, wireless networks, cellular networks and other private and/or public networks. While the illustrated example represents the user(s) 1002 accessing an application 1006 over the network(s) 1008, the described techniques may equally apply in instances where the user(s) 1002 interact with the service provider computer(s) 1010 via user device(s) 1004 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, the application 1006 may allow the user(s) 1002 to interact with the service provider computer(s) 1010 such as to access web content (e.g., web pages, music, video, etc.). The service provider computer(s) 1010, which may be arranged in a cluster of servers or as a server farm, may host the application 1006 and/or cloud-based software services. Other server architectures may also be used to host the application 1006. The application 1006 may be capable of handling requests from many users 1002 and serving, in response, various item web pages. The application 1006 can provide any type of website that supports user interaction, including social networking sites, online retailers, informational sites, blog sites, search engine sites, news and entertainment sites and so forth. As discussed above, the described techniques can similarly be implemented outside of the application 1006, such as with other applications running on the user device(s) 1004.

The user device(s) 1004 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user device(s) 1004 may be in communication with the service provider computer(s) 1010 via the network(s) 1008, or via other network connections. Additionally, the user device(s) 1004 may be part of the distributed system managed by, controlled by or otherwise part of the service provider computer(s) 1010 (e.g., a console device integrated with the service provider computers 1010).

In one illustrative configuration, a user device(s) 1004 may include at least one memory 1014 and one or more processing units (or processor(s) 1016). The processor(s) 1016 may be implemented as appropriate in hardware, computer-executable instructions, firmware, or combinations thereof. Computer-executable instruction or firmware implementations of the processor(s) 1016 may include computer-executable or machine-executable instructions written in any suitable programming language to perform the various functions described. The user device(s) 1004 may also include geo-location devices (e.g., a global positioning system (GPS) device or the like) for providing and/or recording geographic location information associated with the user device(s) 1004.

The memory 1014 may store program instructions that are loadable and executable on the processor(s) 1016, as well as data generated during the execution of these programs. Depending on the configuration and type of the user device(s) 1004, the memory 1014 may be volatile (such as random access memory (RAM)) and/or non-volatile (such as read-only memory (ROM), flash memory, etc.). The user device(s) 1004 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, the memory 1014 may include multiple different types of memory, such as static random access memory (SRAM), dynamic random access memory (DRAM), or ROM.

Turning to the contents of the memory 1014 in more detail, the memory 1014 may include an operating system and one or more application programs or services for implementing the features disclosed herein including at least a user provided input element or electronic service web page, such as via a browser application 1006 or dedicated applications (e.g., smart phone applications, tablet applications, etc.). The browser application 1006 may be configured to receive, store and/or display a website or other interface for interacting with the service provider computer(s) 1010. Additionally, the memory 1014 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 1004.

In some aspects, the service provider computer(s) 1010 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 1010 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computer(s) 1010 may be in communication with the user device(s) 1004 and/or other service providers via the network(s) 1008, or via other network connections. The service provider computer(s) 1010 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, the service provider computer(s) 1010 may include at least one memory 1018 and one or more processing units (or processor(s) 1020). The processor(s) 1020 may be implemented as appropriate in hardware, computer-executable instructions, firmware or combinations thereof. Computer-executable instruction or firmware implementations of the processor(s) 1020 may include computer-executable or machine-executable instructions written in any suitable programming language to perform the various functions described.

In some instances, the hardware processor(s) 1020 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

The memory 1018 may store program instructions that are loadable and executable on the processor(s) 1020, as well as data generated during the execution of these programs. Depending on the configuration and type of the service provider computer(s) 1010, the memory 1018 may be volatile (such as RAM) and/or non-volatile (such as ROM, flash memory, etc.). The service provider computer(s) 1010 or servers may also include additional storage 1022, which may include removable storage and/or non-removable storage. The additional storage 1022 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 1018 may include multiple different types of memory, such as SRAM, DRAM, or ROM.

The memory 1018, the additional storage 1022, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. The memory 1018 and the additional storage 1022 are all examples of computer storage media. Additional types of computer storage media that may be present in the service provider computer(s) 1010 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 1010. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

The service provider computer(s) 1010 may also contain communications connection(s) 1024 that allow the service provider computer(s) 1010 to communicate with a stored database, another computing device or server, user terminals and/or other devices on the network(s) 1008. The service provider computer(s) 1010 may also include I/O device(s) 1026, such as a keyboard, a mouse, a pen, a voice input device, a touch input device, a display, speakers, a printer and the like.

The memory 1018 may include an operating system 1028, one or more data stores 1030 and/or one or more application programs or services for implementing the features disclosed herein, including a management buffer 1032 and a logging buffer 1040. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 10, and/or functions described herein can be provided by one or more modules that exist as separate modules and/or module functions described herein can be spread over multiple modules.

Figure 11:
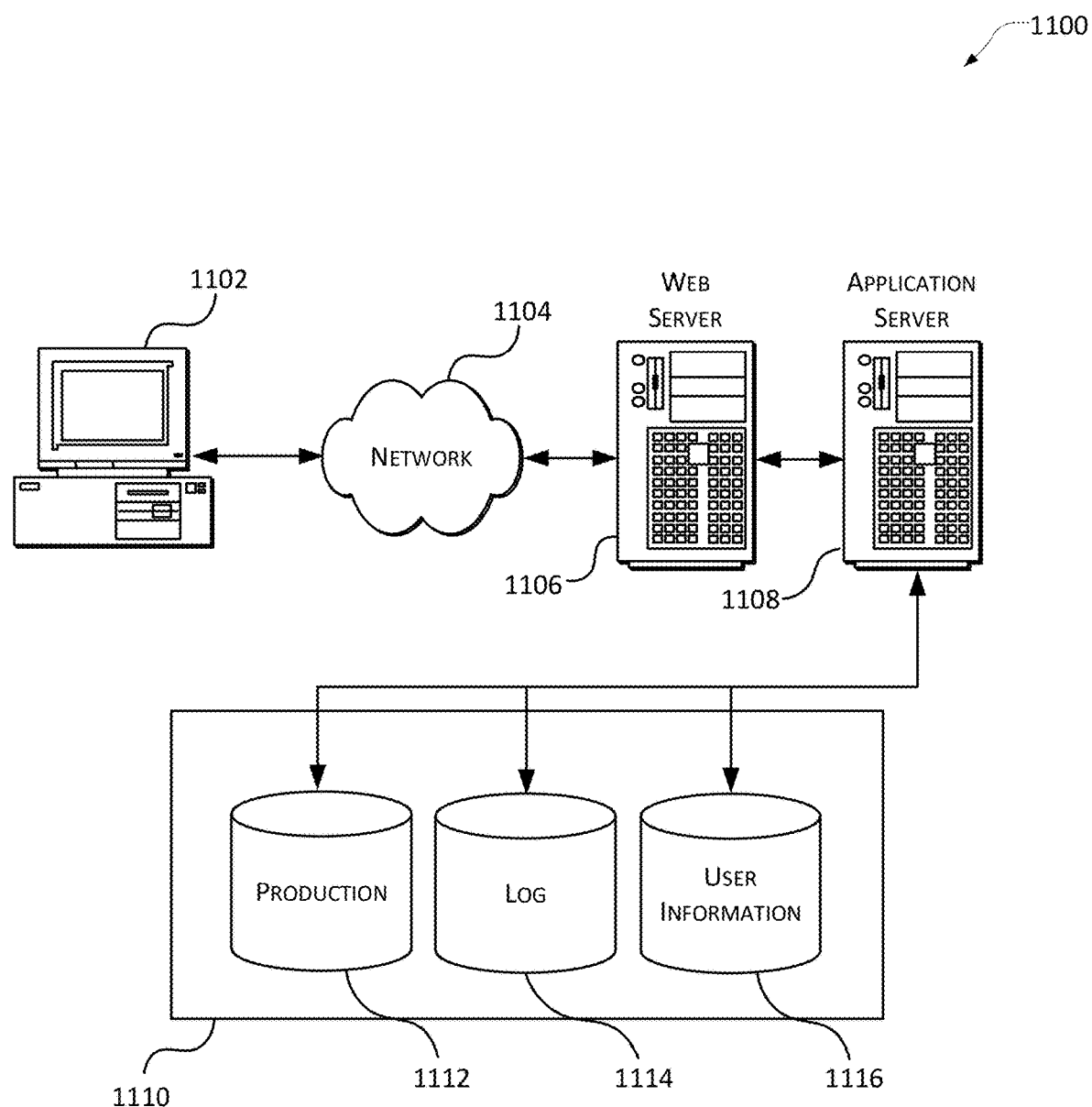
FIG. 11 illustrates aspects of an example environment of a computing system for implementing aspects in accordance with some embodiments.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the Web server.

It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for emulating a peripheral component interconnect (PCI) configuration space in a PCI device, the method comprising:
    receiving, by a PCI core of the PCI device, a PCI configuration access request from a PCI root complex, wherein the PCI device is capable of being connected to and disconnected from a host computing system having a host processor, and wherein the PCI device includes a local processor, an emulated configuration space that is part of the PCI device, and a non-emulated native configuration space having a native configuration register associated with functionalities common to multiple peripheral devices;
    sending, by the PCI core to a configuration management module of the PCI device, the PCI configuration access request;
    determining, by the configuration management module of the PCI device, that the PCI configuration access request is for the emulated configuration space instead of the non-emulated native configuration space;
    sending, by the configuration management module to an emulation module that is part of the PCI device, an interrupt request associated with the PCI configuration access request;
    in response to the interrupt request, executing, by the emulation module of the PCI device, configuration space emulation software to retrieve an emulated configuration from the emulated configuration space of the PCI device; and
    servicing the PCI configuration access request using the emulated configuration.

2. The method of claim 1, wherein servicing the PCI configuration access request includes sending, to the PCI root complex, the emulated configuration when the PCI configuration access request is a configuration read request.

3. The method of claim 2, wherein servicing the PCI configuration access request further includes modifying the emulated configuration.

4. The method of claim 1, wherein servicing the PCI configuration access request includes updating the emulated configuration when the PCI configuration access request is a configuration write request.

5. The method of claim 1, wherein the emulated configuration space includes emulated configurations for a plurality of PCI devices.

6. The method of claim 1, wherein the emulated configuration space is stored in a DRAM.

7. The method of claim 1, wherein the emulated configuration space is stored in a persistent memory.

8. The method of claim 1, wherein the configuration space emulation software is executed in an isolated environment.

9. A peripheral device comprising:
   a local processor;
   an emulation component;
   a bus interface core including a non-emulated native configuration space having a native configuration register associated with functionalities common to multiple peripheral devices; and
   a configuration management component coupled to the bus interface core, the configuration management component configured to:
      receive a configuration access request from the bus interface core;
      determine whether the configuration access request is for the non-emulated native configuration space or for an emulated configuration space that is part of the peripheral device;
      request the emulation component of the peripheral device to retrieve an emulated configuration from the emulated configuration space in response to determining that the configuration access request is for the emulated configuration space; and
      service the configuration access request using the emulated configuration,
   wherein the peripheral device is capable of being connected to and disconnected from a host computing system having a host processor.

10. The peripheral device of claim 9, wherein the emulated configuration space includes emulated configurations for a plurality of peripheral devices.

11. The peripheral device of claim 9, wherein the emulated configuration represents a physical function resource.

12. The peripheral device of claim 9, wherein the emulated configuration represents a virtual function resource.

13. The peripheral device of claim 9, wherein the emulated configuration is retrieved via execution of configuration emulation software running in an isolated environment.

14. The peripheral device of claim 9, wherein the configuration management component includes a status register to track progress of the configuration access request, and wherein the status register is updated after completion of servicing the configuration access request.

15. The peripheral device of claim 9, wherein the emulation component is coupled to a DRAM, and wherein the emulated configuration space is stored in the DRAM.

16. The peripheral device of claim 9, wherein the emulation component is coupled to a persistent memory, and wherein the emulated configuration space is stored in the persistent memory.

17. The peripheral device of claim 9, wherein the emulated configuration space is stored as a text file.

18. The peripheral device of claim 9, wherein at least one of the emulation component, the bus interface core, and the configuration management component comprise an electronic circuit.

19. The peripheral device of claim 9, wherein the peripheral device is implemented using a system-on-chip (SoC), an application-specific integrated circuit (ASIC), or a field-programmable gate array (FPGA).

20. A method for emulating a configuration space by a peripheral device, the method comprising:
   receiving, by the peripheral device, a configuration access request, wherein the peripheral device is capable of being connected to and disconnected from a host computing system having a host processor, and wherein the peripheral device includes a local processor, an emulated configuration space that is part of the peripheral device, and a non-emulated native configuration space having a native configuration register associated with functionalities common to multiple peripheral devices;
   determining, by the peripheral device, whether the configuration access request is for the non-emulated native configuration space or for the emulated configuration space;
   determining, by the peripheral device, that the configuration access request is for the emulated configuration space;
   retrieving, by the peripheral device, an emulated configuration from the emulated configuration space; and
   servicing, by the peripheral device, the configuration access request using the emulated configuration.

21. The method of claim 20, wherein the emulated configuration space includes emulated configurations for a plurality of peripheral device functions.

22. The method of claim 20, wherein the emulated configuration represents a physical function resource.

23. The method of claim 20, wherein the emulated configuration represents a virtual function resource.

24. The method of claim 20, wherein servicing the configuration access request includes providing the emulated configuration to a source of the configuration access request.

25. The method of claim 20, wherein servicing the configuration access request includes updating the emulated configuration.

* * * * *